United States Patent [19]

Smith et al.

[11] Patent Number: 5,040,190

[45] Date of Patent: Aug. 13, 1991

[54] ANALOG DATA STATION TERMINAL

[75] Inventors: Mark C. Smith; Roger W. Cain, both of Huntsville, Ala.

[73] Assignee: Adtran, Huntsville, Ala.

[21] Appl. No.: 455,161

[22] Filed: Dec. 22, 1989

[51] Int. Cl.⁵ .................................................. H04B 1/38
[52] U.S. Cl. ............................................. 375/4; 375/7; 375/20; 370/84
[58] Field of Search ................ 375/3, 4, 7, 17, 20, 375/111; 370/84, 97, 105.1; 178/71 R, 71 L; 341/56, 95

[56] References Cited

U.S. PATENT DOCUMENTS

| | | | |
|---|---|---|---|
| 3,909,721 | 9/1975 | Bussgang et al. | 375/67 |
| 4,403,331 | 9/1983 | Halpern et al. | 375/37 |
| 4,748,637 | 5/1988 | Bishop et al. | 375/7 |
| 4,823,363 | 4/1989 | Yoshida | 375/20 |
| 4,876,695 | 10/1987 | Witters et al. | 375/3 |

OTHER PUBLICATIONS

Bell Communications Research, Technical Advisory TA-TSY-000083, *Digital Data System-Requirements for the Office Channel Unit*, Issue 1 (Dec. 1984).

The Bell System Technical Journal, *Dataport-Channel Units for Digital Data System 56-kb/s Rate*, Dunbar et al. (vol. 61, No. 9, Nov. 1982).

*Primary Examiner*—Benedict V. Safourek
*Attorney, Agent, or Firm*—Dann, Dorfman, Herrell and Skillman, P.C.

[57] ABSTRACT

An analog data station terminal is described for use in a high speed data telecommunication system. The analog data station terminal interfaces a customer modem to the local telephone line for transmission of data at very high data rates, e.g., more than 9600 bits per second, with significant reduction in error rate. The analog data station terminal receives analog signals from the customer modem and converts then to a digital form that is compatible with the telephone system. The analog data station terminal also receives digital data from the telephone system and converts it to analog form for input to the customer modem. The formatting and reformatting of the data signals are performed synchronously with the telephone digital data network.

28 Claims, 18 Drawing Sheets

ANALOG DATA STATION TERMINAL

BACKGROUND OF THE INVENTION

This invention relates to data communication systems and in particular to an analog data station terminal for synchronously interfacing an analog data communication device with a digital data communication network.

The public telephone network includes hard wire circuits consisting of two or more conductors connected between each telephone user and a central office, and switching equipment located at the central office which automatically routes calls from one customer to another. Because the public telephone network was originally designed to carry voice transmissions, the hard wire circuits are designed to provide a bandwidth of about 3 kilohertz. The advent of digital computers and data terminals brought about a need to have such devices communicate through the public telephone network. However, because digital devices must communicate with digital or binary encoded signals it is necessary to use a modem to provide such digital devices access to the analog based telephone network. A modem, which stands for modulator/demodulator, converts a digital signal to an analog audio signal which can be sent over the 3 kilohertz bandwidth limited circuits of the telephone network.

As computer technology and the need for faster communication have developed, the data transmission rates have steadily increased from about 300 bits per second to about 9600 bits per second and even higher, for example, as high as 56 kilobits per second. The telephone voice network however, is still designed to the basic 3 kilohertz bandwidth and reliable transmission of digital data over the voice network becomes increasingly difficult at the higher data rates. Voice-band telephone lines which have acceptable characteristics for voice signals are not suitable for high speed, modulated signals and so must be conditioned to prevent, or at least minimize, information loss. One method of line conditioning is equalization. Equalization is accomplished by manually adjusting active filters located at the telephone company's central office and at a customer's premises to compensate for amplitude losses and phase changes of signals between 100 and 3200 hertz. Equalization is a time consuming technique requiring special test equipment and highly skilled technicians. Accordingly, it can be a costly process.

Known devices for connecting a high speed analog modem to the telephone company's central office include a special terminal at the customer's premises, the four wire customer loop circuit, and a channel card located at the telephone company's central office. The central office channel card provides electronic line conditioning on signals from the customer premise to the central office. The terminal at the customer's premises provides electronic conditioning of signals from the central office to the customer. As indicated above, the earlier known systems require manual adjustment of the amount of compensation to provide the optimum bandpass for the data signals. Automatic equalization devices for making compensating adjustments at the customer premises have been developed which utilize a series of electronically generated tones selected in the bandpass. Although such automatic devices eliminate the need for manual compensation, the complexity, and hence the cost, of such automatic conditioning equipment is very high.

It would be highly desirable to eliminate the need for analog equalization by transporting the data signal in digital form from the customer's premises to the central office and vice versa. To achieve a digital signal that is compatible with the existing digital telephone network, it is necessary to sample and convert the analog signal generated by the modem in a manner which is synchronous with the telephone company multiplexing equipment at the central office.

SUMMARY OF THE INVENTION

The aforementioned problems associated with data communication over the existing telephone network are resolved to a large degree by an analog data station terminal according to one feature of the present invention. The analog data station terminal (ADST) includes an analog receiver section, a digital receiver section, an analog generator section, a digital transmitter section, and a computer. The analog receiver section is connected to the customer modem for receiving the analog signal therefrom and includes an analog to digital coder for changing the analog signal to a first parallel data word containing N serial bits of digital data. The first parallel data word is generated in synchronism with a network byte clock.

The digital receiver section is connected to the customer loop for receiving M serial bits of bipolar digital data at the customer loop data rate and includes a serial-to-parallel converter for converting the M serial bits into a second parallel data word. The M bits include N bits of data and a data word (or byte) framing bit. A loop clock recovery circuit in the digital receiver section generates a clock pulse that is in synchronism with the customer loop byte rate.

The computer is operatively connected to the analog receiver section and the digital receiver section and is programmed for reading the first parallel data word and converting it to a third parallel data word containing M bits including the data word framing bit. The processing of the first parallel data word by the computer is performed in synchronism with the network byte clock. The computer is also programmed for reading the second parallel data word and for converting it to a fourth parallel data word containing N bits of digital data. The second conversion being performed in synchronism with the customer loop byte clock.

The analog generator section is connected to receive the fourth parallel data word from the computer and to generate a second analog signal from the fourth parallel data word in synchronism with the network clock for output to the customer's modem. The digital transmitter section is connected to receive the third parallel data word from the computer in synchronism with the network byte clock and to generate M serial bits of bipolar digital data at the customer loop data rate.

The ADST in accordance with the present invention substantially eliminates the need for analog equalization at both ends of the customer loop line because a digital signal is transported between the customer location and the telephone company central office. The ADST according to the present invention employs a method of sampling and converting analog signals to digital that maintains synchronism with the telephone network and uses a digital data system (DDS) secondary channel technique to ensure byte recovery at both the customer location and at the central office. Thus, the ADST of this invention is fully compatible with existing DDS equipment and operating requirements.

BRIEF DESCRIPTION OF THE DRAWINGS

Further advantages and novel features of the present invention will be apparent from the following detailed description of the invention and the accompanying drawings wherein.

DETAILED DESCRIPTION

Figure 1:
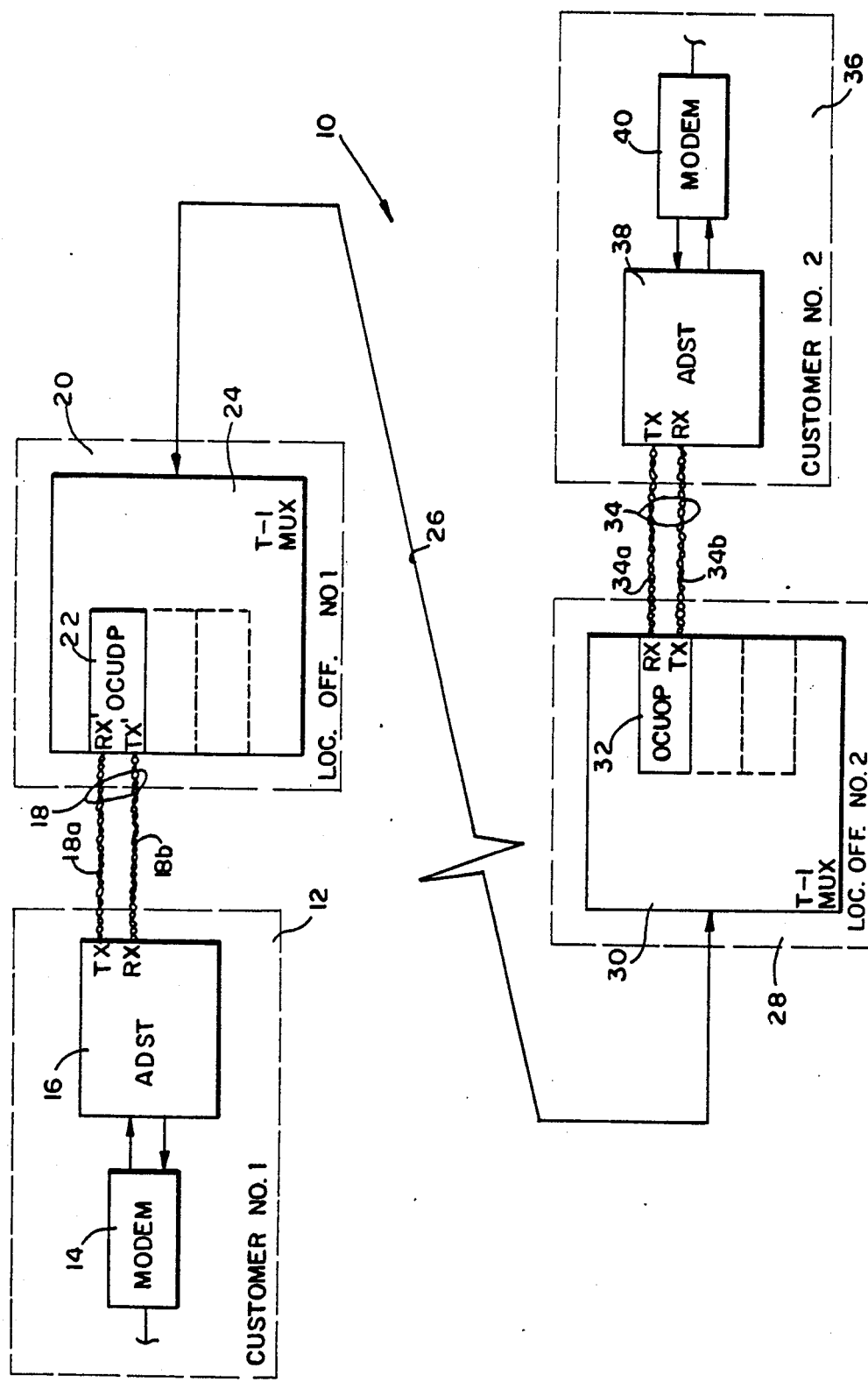
FIG. 1 is a block diagram of a telecommunications system according to one feature of the present invention.

Referring now to the drawings and in particular to FIG. 1 there is shown generally a synchronized data telecommunications system 10. A first customer data station 12 in the telecommunication system 10 includes a high speed modem 14 connected to the customer's computer or other data processing device (not shown). As is well known, the modem 14 converts the digital data signals from the customer data processing equipment into a modulated analog signal. An ADST 16 is connected to modem 14 for receiving the modulated analog signal therefrom or sending a modulated analog signal thereto. The ADST 16 converts the modulated analog signal to a digital signal in the form of a series of pulses, preferably bipolar pulses. Similarly, the analog data station terminal 16 is equipped for transforming a digital signal in the form of bipolar pulses to a modulated analog signal.

The first customer data station 12 is connected by a two pair (four wire) customer line 18 to a first local office 20 of the telephone company. The two pair line between a customer location and a local office of the telephone company is known as a customer loop. A first wire pair 18a is connected between the transmit (TX) terminal of the ADST 16 and the receive (RX') terminal of an office channel unit/dataport (OCUDP) 22 at the local office 20. Similarly, a second wire pair 18b is connected between the receive (RX) terminal of the ADST 16 and the transmit terminal (TX') of the OCUDP 22. The OCUDP 22 is one of a plurality of such units that are connected to multiplexor 24, such as the T-1 multiplexor (MUX) used with the type D4 channel bank. In operation, the multiplexor 24 is byte synchronized to all other such multiplexors in the telephone network. Thus, multiplexed data from a plurality of customer data stations can be transmitted over a long distance transmission line 26 to a second telephone company local office 28 in a location remote from the first local office 20. The second local office 28 includes a multiplexor 30 similar to that at the first local office 20 and having at least one OCUDP 32. The multiplexed data signals are demultiplexed in the second multiplexor 30 such that a data stream can be transmitted through the OCUDP 32 along a wire pair 34b of customer loop line 34 to a second customer data station 36. Data signals are transmitted from the second customer data station 36 to the second telephone company local office 28 over a wire pair 34a. The second customer data station 36 includes an ADST 38 and a high speed modem 40. The ADST 38 and modem 40 at the second customer location 36 function in a similar manner to the corresponding components at the first customer data station 12.

Because the digital signal transmitted over the telephone company network is byte synchronized, a data word of specific value can be sent to any other point in the network and its correct value exactly determined at the receiving point. The ADST used at the customer location for converting the modulated analog signal into digital form, and vice versa, must do so in a manner that is synchronous with the telephone network. Accordingly, the ADST 16 or 38 in accordance with the present invention transfers data from the customer modem to the customer loop and from the customer loop to the customer modem in a manner that is synchronized to the telephone digital network.

Figure 2:
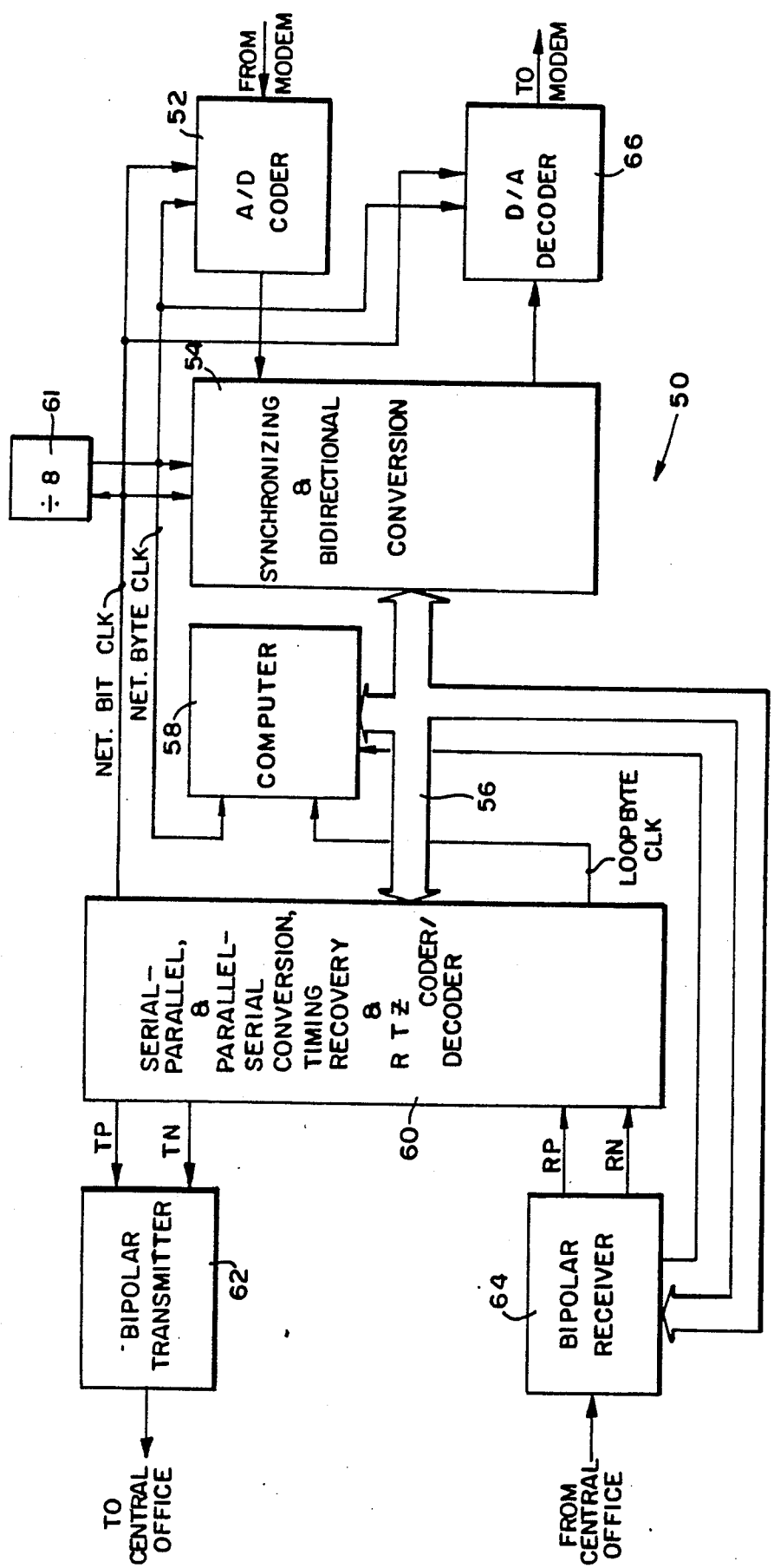
FIG. 2 is a block diagram of an analog data station terminal according to another feature of the present invention.

FIG. 2 shows a block diagram of an ADST 50 according to the present invention. The ADST 50 includes an analog receiver section having an analog-to-digital coder 52 that is capable of converting an analog signal to digital form. The digital output of analog-to-digital coder 52 is input to a synchronization and bidirectional conversion circuit 54 which performs serial-to-parallel conversion of the digital signal in synchronism with the network byte clock. The resulting parallel data word or byte is read over data/address bus 56 by a computer or microprocessor 58. The computer 58 reformats the data byte with framing information. A reformatted data byte from computer 58 is written over the bus 56 to a control logic circuit 60 in synchronism with the network byte clock. Logic circuit 60 performs parallel-to-serial conversion, and return to zero (RTZ) coding as part of the digital transmitter section. Logic circuit 60 provides a 64 khz network bit clock signal to the analog receiver section for shifting data bits between the coder 52 and circuit 54. A divide-by eight counter 61 receives the 64 khz network bit clock from logic circuit 60 and generates an 8 khz network byte clock. The network byte clock is input to computer 58 as a processing interrupt signal and is also input to the analog receiver section for maintaining byte synchronism with the network.

Continuing in the modem to network processing direction, the logic circuit 60 generates a pair of rail signals TP and TN. The rail signals are input to a bipolar transmitter 62 for transmission over the customer loop line to the telephone company local office as a series of bipolar pulses.

The ADST 50 is also equipped for processing data in the network to modem direction. A bipolar receiver 64 receives a serial bit stream from the telephone company local office and generates the rail signals RP and RN in connection with control signals from the computer 58. The dual rail signals RP and RN are input to the control logic circuit 60 for conversion to a parallel dataword such as can be read over bus 56 by the computer 58. The computer 58 reads a data byte containing N data bits and a byte framing bit from logic circuit 60 in synchronism with the customer loop byte clock, extracts the byte framing bit, and converts the N bits of data to an N-bit byte. The customer loop byte clock is generated by logic circuit 60 and is input to computer 58 as a second processing interrupt. In the preferred embodiment, the computer reads a 9-bit parallel word and converts it to an 8-bit parallel word after extracting the byte framing bit which is embedded in the 8th bit position of the 9-bit word. The computer is programmed to check for proper alignment of the incoming data bytes from the network. The converted data bytes from the network are written by the computer 58, over bus 56 to the synchronization and bidirectional conversion circuit 54 where they are synchronously converted from parallel form to a serial bit stream for input to the digital-to-analog decoder 66. Digital-to-analog decoder 66 includes a digital to analog converter that produces a modulated analog signal which corresponds to the N-bit data byte.

Figure 2A:
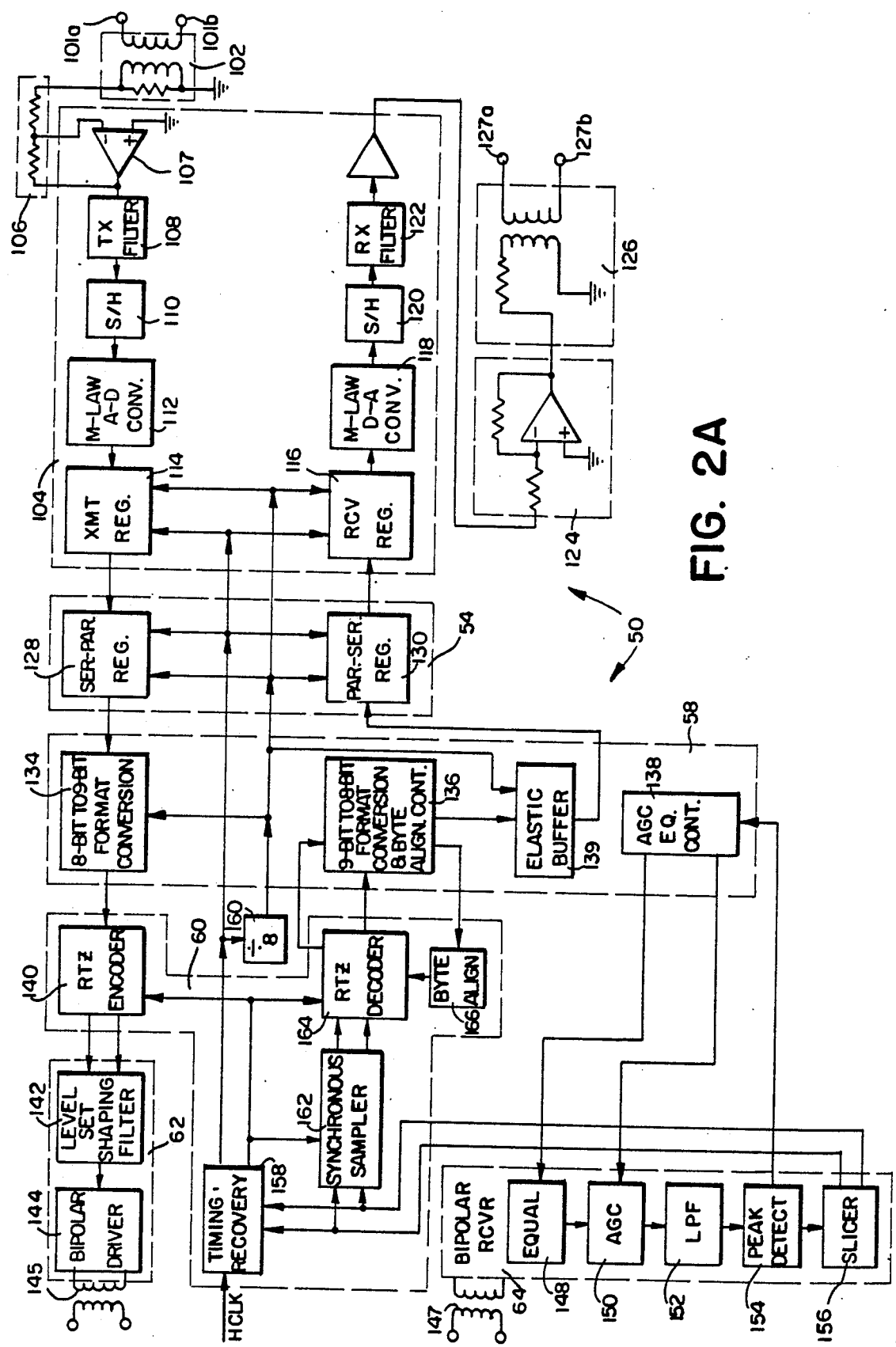
FIG. 2A is a partial schematic diagram of a preferred embodiment of the analog data station terminal of FIG. 2.

Referring now to FIG. 2A there is shown a preferred configuration of the ADST 50 according to the present invention. The input terminals 101a and 101b of the ADST 50 are formed to be connected to the output of the customer's high speed modem. The input terminals 101a and 101b are connected to one side of a coupling transformer 102. The other winding of transformer 102 is connected to an analog/digital coder/decoder (CODEC) 104 through a fixed attenuator 106 to the inverting input of comparator 107. The output of comparator 107 is connected to a filter 108 in CODEC 104 and fed back through attenuator 106 to the inverting input of comparator 107. The values of the feed-forward and feedback resistors in attenuator 106 are selected to provide an attenuated signal level to the CODEC 104. The amount of the signal level attenuation is selected to provide at least a predetermined threshold signal level for the analog signal input to the customer modem at a remote customer data station to which data is transmitted, when the remote data station is not equipped with an ADST.

The output of filter 108 is connected to a sample and hold circuit 110 whose output is connected to the input of an analog to digital converter 112. Analog to digital converter 112 need not be any special design, and can be a known "μ-law" or "A-law" logarithmic converter. The output of analog to digital converter 112 is connected to a register 114 which holds the digitized signal representing the analog signal from the modem and transfers the digital signal in bytes that are N-bits in length to the next stage of the ADST 50.

The CODEC 104 also includes a register 116 for receiving a byte of digital data that has been received from the telephone network and reformatted as will be described below. The output of the register 116 is connected to the input of a μ-law or A-law digital to analog converter 118. A sample and hold circuit 120 is connected to receive the analog signal from the digital to analog converter 118. The output of the sample and hold circuit 120 is connected to the input of a filter 122 the output of which is a modulated analog signal. A fixed attenuator 124 adjusts the level of the signal to a desired value. The output of the fixed attenuator 124 is connected to a coupling transformer 126 having output terminals 127a and 127b that are formed to be connected to the input terminals of the customer's high speed modem.

The next section of ADST 50 is the synchronization and bidirectional conversion circuit 54 that includes a serial-in/parallel-out register 128 which receives N bits of digital data from CODEC 104 at the network bit clock rate, 64 kilohertz, for example, and provides an N-bit parallel word or byte to the data ports of the microprocessor 58. The N-bit parallel data word is clocked out of the serial-in/parallel-out register 128 at the network byte clock rate, for example, 8 kilohertz.

In a similar manner a parallel-in/serial-out register 130 is connected to receive a data byte, N-bits in length from the microprocessor 58. The parallel-in/serial-out register 130 has its output connected to the input of register 116 in CODEC 104. As will be described more fully hereinbelow, the N-bit bytes are loaded into the parallel-in/serial-out register 130 at the network byte clock rate. The N bits of data are shifted out to the CODEC 104 at the network bit clock rate.

Microprocessor 58 is programmed to perform bidirectional data format conversion, byte alignment, and synchronization of data bytes received from the customer loop, and to control the automatic gain control and equalizer circuits of the bipolar receiver described below. In this regard the read only memory (ROM) (not shown) of microprocessor 58 contains a software module 134 for performing bit-length format conversion on the data for transmission to the customer loop, by adding a byte framing bit to form an N+1 bit length byte. Another software module 136 is stored in the microprocessor ROM for performing bit-length format conversion on the data received from the customer loop. Software module 136 also performs byte synchronization and alignment control functions to ensure that the received digital data is properly identified. An elastic buffer 139, preferably in a random access memory (RAM), is provided in microprocessor 58 for temporarily storing the reformatted, N-bit data bytes received from the customer loop. The reformatted N-bit data bytes are loaded into the elastic buffer at the customer loop byte rate, but are loaded out from the elastic buffer to the parallel-in/serial-out register 130 at the network byte rate. A third software module 138 is also stored in the microprocessor ROM for controlling the automatic gain control circuit 150 and equalizer circuit 148 of the bipolar receiver 64.

The microprocessor 58 is connected on its network side to the integrated, control logic circuit 60. The control logic circuit 60 has a bipolar, return-to-zero (RTZ) encoder 140 which converts the N+1 bits of the parallel word to a serial binary signal. The RTZ encoder 140 has dual outputs one for pulses that are to be transmitted with positive polarity and one for pulses that are to be transmitted with negative polarity. The dual outputs of RTZ encoder 140 are connected to the input of the bipolar transmitter 62 which includes a level set and shaping filter circuit 142 for setting the amplitude and frequency characteristics of the signals. The output of circuit 142 is connected to the input of a bipolar driver 144. The output of bipolar driver 142 is connected to one wire pair of the customer loop line through a coupling transformer 145 for transmission of the bipolar signals to the local office in bipolar form.

The bipolar receiver 64 is connected through coupling transformer 147 to the other wire pair of the customer loop line. Bipolar receiver 64 includes an equalizer section 148, the output of which is connected to the input of an automatic gain control (AGC) circuit 150. The output of AGC circuit 150 is connected to the input of a low pass filter 152 which has its output connected to the input of a peak detector circuit 154. The output of peak detector circuit 154 is connected to a slicer circuit 156 which provides a pair of rail signals RP and RN to the control logic circuit 60.

In the control logic circuit 60, a timing recovery circuit 158 and a synchronous sampling circuit 162 are connected to receive the rail signals RP and RN. Timing recovery circuit 158 is also connected to receive a local reference clock signal HCLK. Timing recovery circuit 158 provides a first clock pulse that is representative of the network bit clock rate. A counter 160 is connected to receive the first clock pulse at the network bit clock rate and divides the network bit clock to provide a second clock pulse that is in synchronism with the network byte clock. The synchronous sampler 162 provides synchronized rail signals RXP and RXN to the input of an RTZ decoder 164. The RTZ decoder 164 provides a parallel byte, N bits in length, for input to the microprocessor 58. RTZ decoder 164 generates a third clock pulse that is in synchronism with the customer loop byte transmission rate, i.e., the loop byte clock. Byte alignment control circuit 166 is provided in the control logic circuit 60 for receiving alignment control signals from the microprocessor 58 and in response thereto, effecting adjustment of the RTZ decoder to obtain and maintain byte alignment in the received digital data signals from the network.

Figure 3:
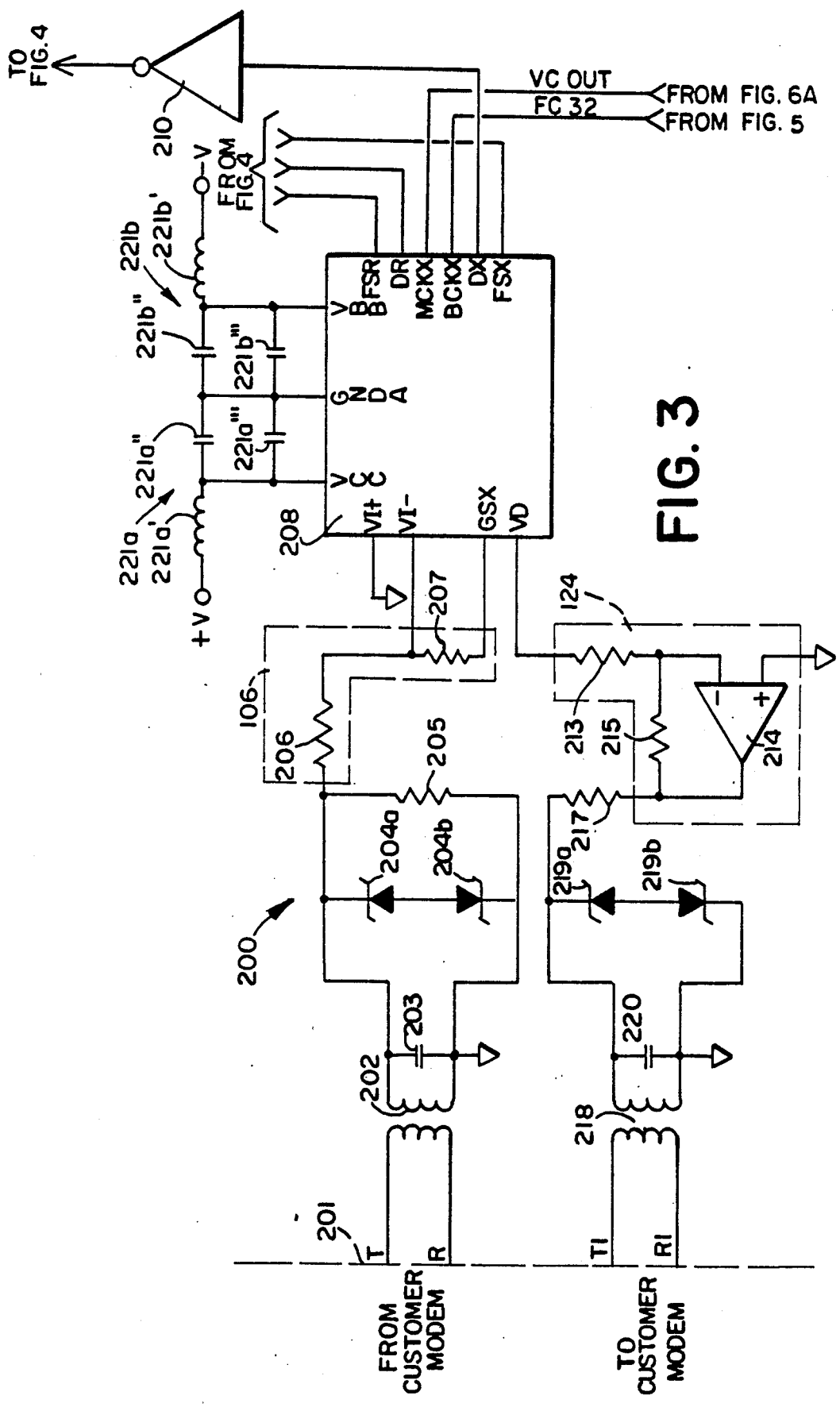
FIG. 3 is a schematic diagram of a preferred circuit for the analog receiver and analog generator sections of the analog data station terminal of FIG. 2.

Referring now to FIG. 3 there is shown a preferred circuit 200 for the analog receiver and analog generator stages of the ADST 50 according to the present invention. The terminals T and R of the modem-to-ADST interconnection 201 are connected to receive a modulated analog data signal from the customer's modem (not shown). A coupling transformer 202 has one winding connected across the terminals T and R. A capacitor 203, a pair of zener diodes 204a and 204b connected anode to anode, and a resistor 276 are connected in parallel across the other winding of coupling transformer 202. Capacitor 203 filters noise which could otherwise be fed back to the modem from the ADST. The zener diodes 204a and 204b are connected in the manner shown to provide over-voltage protection for the analog receiver 52. Resistor 205 determines the impedance seen by the modem across terminals T and R and is selected in accordance with the desired impedance for a particular installation. Resistors 206 and 207 are selected to provide the desired level of attenuation of the modulated analog signal received from the modem. Resistor 206 is connected between the ungrounded terminal of transformer 202 and the inverting input terminal (VI−) of an integrated circuit 208 embodying the CODEC 104. Resistor 207 is connected between the comparator output terminal (GSX) and the inverting input terminal (VI−) of the integrated circuit 208. The non-inverting input (VI+) of the comparator in the integrated circuit 208 is connected to ground.

Circuit 208 need not be of special design and is preferably one of the commercially available codec/filter microchips. For example, in the embodiment shown in FIG. 3, integrated circuit 208 is a model No. TP3054 manufactured by National Semiconductor. It will be appreciated that the ADST according to the present invention can be designed to utilize other makes of CODEC/filter chips. However, the preferred embodiment is described with reference to a description of the ADST using the model TP3054 CODEC/filter.

The modulated analog signal from the modem is converted by the integrated circuit 208 in accordance with known techniques for converting an analog signal to a digital signal, for example, with a $\mu$-Law or A-Law logarithmic converter. The serial bits of digital data are output at terminal DX of integrated circuit 208 and input through an inverter 210 to a parallel-to-serial converter.

Serial bits of digital data which have been received from the network, decoded, and reformatted are input to the integrated circuit 208 at terminal DR. The serial data is converted to analog form and the corresponding analog signal is output at terminal VO.

The analog signal generated by integrated circuit 208 is input to a fixed attenuator circuit 212. The fixed attenuator 212 includes a resistor 213 connected to the non-inverting input of a comparator 215, and a second resistor 214 connecting the output of comparator 215 to the inverting input. The non-inverting input of comparator 215 is connected to ground. The resistances 213 and 215 are selected to provide the desired signal level at the output of attenuator 212 for input to the customer's modem.

The output of the fixed attenuator circuit 212 is input through a series resistor 217 to one winding of a coupling transformer 218. The other winding of transformer 218 is connected to terminals T1 and R1 of the modem-to-ADST interface 201. The zener diodes 219a and 219b are connected anode-to-anode across the first winding of transformer 218 to provide over-voltage protection. A capacitor 220, also connected across the terminals of transformer 218, filters noise from the outgoing analog signal to the modem.

The positive voltage input (VCC) and negative voltage input (VBB) of integrated circuit 208 are connected to respective positive and negative voltage supplies through filters 221a for the positive voltage supply and 221b for the negative voltage supply respectively. Each filter 221a, 221b includes an induction coil 221a', 221b' and a pair of capacitors 221a'', 221b'' and 221a''', 221b''', respectively. The capacitors are connected between the induction coils and ground as shown in the FIG. 3.

As will be described more fully hereinbelow various timing or clock signals are employed by the integrated circuit 208 in order to convert the analog signal to digital form and the digital signal to analog form in a manner that is synchronous with the telephone network. To this end an 8 kilohertz byte clock for loading out bytes of converted data from the integrated circuit 208 is provided at terminal FSR. A similar 8 khz byte clock having a predefined phase difference from the first 8 khz clock for loading bytes of data from the network to the digital to analog convertor is provided at terminal FSX of integrated circuit 208. A 64 kilohertz bit clock is provided at terminal BCKX and a 2.048 megahertz clock is provided at input terminal MCKX of integrated circuit 208. The 64 khz bit clock is used by the integrated circuit 208 for shifting data bits out of the register 114 from the analog-to-digital converter 112 and is also used for shifting data bits into the digital-to-analog converter 118 from the register 116 as shown in FIG. 2A. The 2.048 megahertz clock is required for use by the model TP3054 CODEC/filter, but may not be required for other models of CODEC/filters.

Figure 4:
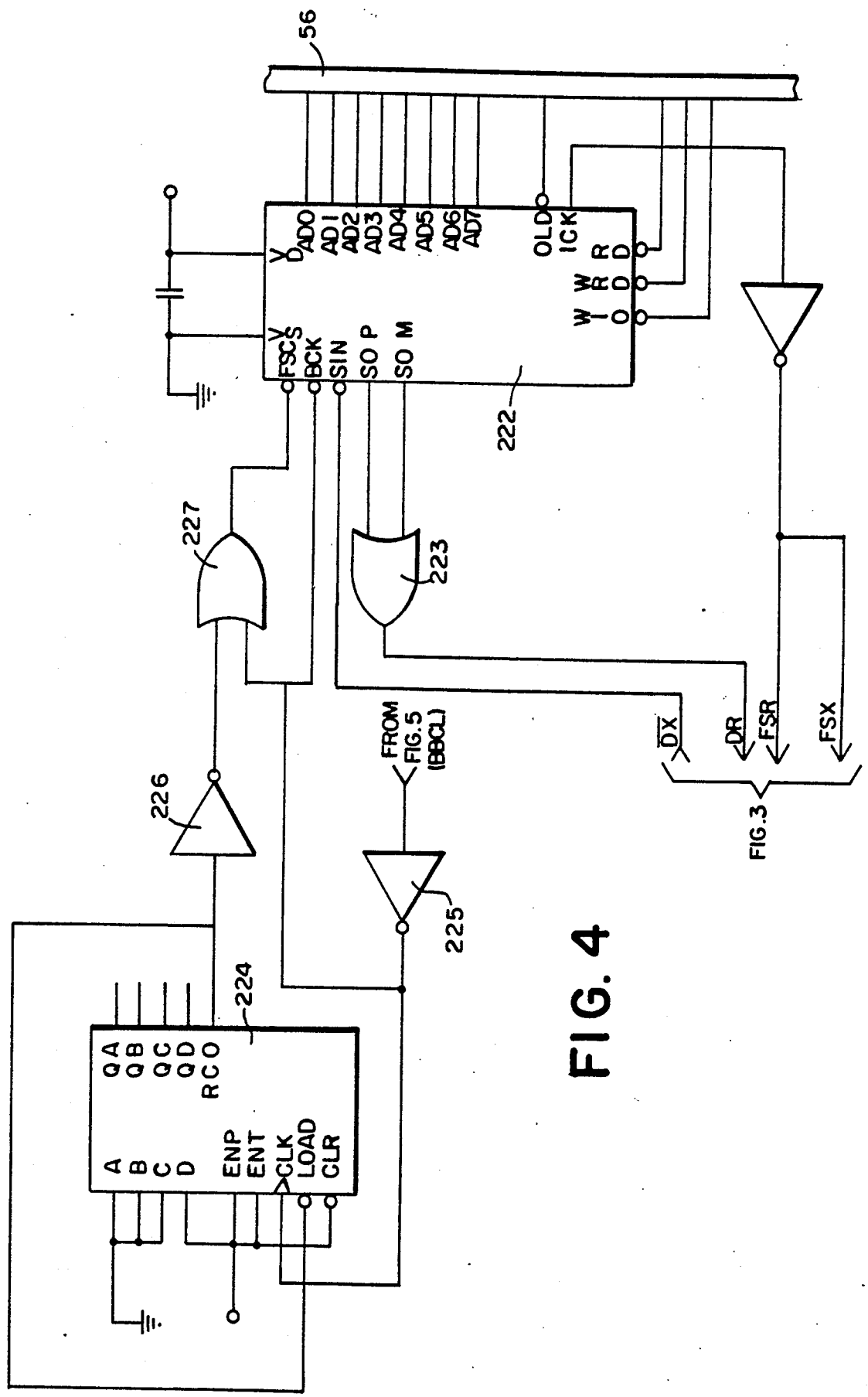
FIG. 4 is a schematic diagram of a preferred circuit of a synchronization and bidirectional conversion section of the analog data station terminal of FIG. 2.

Referring now to FIG. 4 there is shown a preferred arrangement embodying the synchronization and bidirectional conversion circuit 54 of FIG. 2A. An integrated circuit configured as a bidirectional, serial to parallel/parallel to serial, data converter 222, is designed to convert N serial bits of data from the CODEC 104 into an N-bit parallel data word or byte for transfer to the microprocessor 58. The serial data from the CODEC 104 is input to the bidirectional converter 222 at the input terminal SIN. The parallel data word is output from the bidirectional converter 222 at the bidirectional ports AD0-AD7. The bidirectional converter 222 is also designed to receive a parallel data word, N bits in length, from the microprocessor 58 and to convert the parallel data word to N data bits. The N data bits are provided at the SO P and SO M ports of bidirectional converter 222 as will be described more fully below. The serial data bits from each port SO P and SO M are input to the respective input terminals of OR-gate 223 which provides a single serial bit stream to the input register 116 of the CODEC 104.

The timing signals described above for clocking data bits and bytes through the bidirectional converter 222 are provided at the input terminals BCK and FSC. Preferably, a 64 kilohertz bit clock is input at terminal BCK and an 8 kilohertz byte clock is input at terminal FSC. In the embodiment shown in FIG. 4, the 8 kilohertz byte clock is derived from a recovered 64 kilohertz local clock by means of a synchronous counter 224 which is configured as a divide by eight counter. The 64 kilohertz clock is provided from the control logic 60 through an inverter 225 to the CLK terminal of synchronous counter 224. The synchronous counter 224 counts the 64 kilohertz clock pulses and, every eighth pulse, the counter outputs a pulse at output terminal RCO. The clock pulses output at terminal RCO are at a frequency of 8 kilohertz and are transferred through an inverter 226 and OR-gate 227 to the FSC terminal of bidirectional converter 222. As will be described more fully hereinbelow, the bidirectional converter 222 includes internal timing circuitry for generating additional 8 kilohertz byte clocks which are output at terminals OLD and ICK thereof respectively. The clock pulse provided at OLD functions as an interrupt signal to the microprocessor 58. The clock pulse output at terminal ICK is input to the FSR and FSX terminals of integrated circuit 208. Clock pulse ICK functions to define the byte length of the digital data generated by the analog to digital converter 112 by acting as a load-in signal to the register 114 in CODEC 104. Clock pulse ICK also functions to define the of length data bytes provided to the digital to analog converter 118 by acting as a load-out signal to the register 114. The inverted clock pulse $\overline{ICK}$, when present, signals the CODEC/filter 104 that N-bits of data are to be loaded out of register 116 for conversion to an analog signal.

Figure 4A:
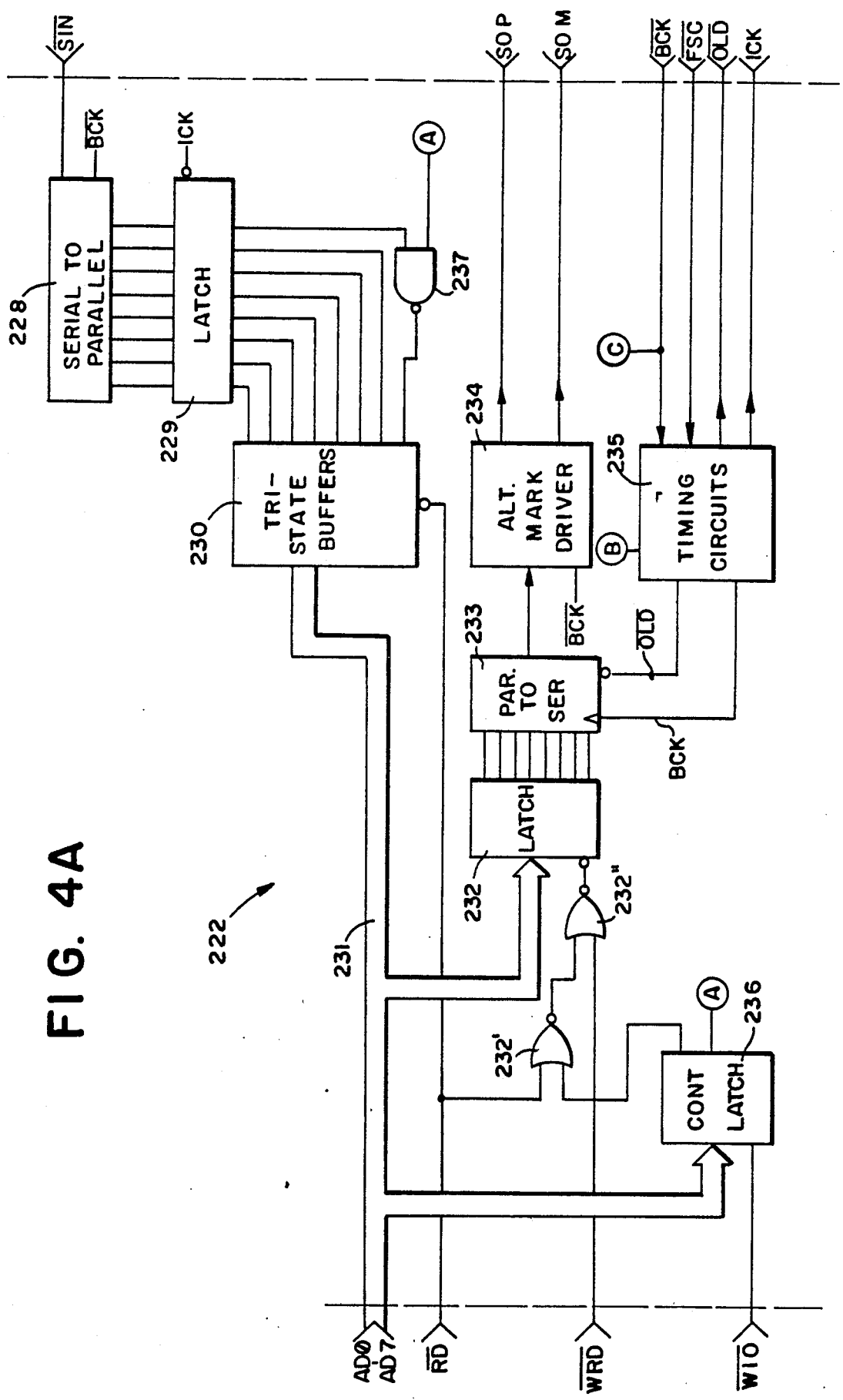
FIG. 4A is a partial schematic diagram of a preferred configuration for the bidirectional converter circuit of FIG. 4.

Referring now to FIG. 4A there is shown a preferred circuit configuration for the bidirectional converter 222. The serial data from the CODEC 104 is clocked into a serial-in/parallel-out register 228 by the 64 kilohertz clock, BCK. The parallel data word at the output of serial-in/parallel-out register 228 is transferred to a data latch 229 in synchronism with the byte clock ICK, and buffered into a buffer register upon receipt of the read signal $\overline{RD}$ from the microprocessor. When the microprocessor is interrupted by the interrupt signal, byte clock $\overline{OLD}$, it reads the parallel data word from buffer register 230 over bus 231.

A data byte to be transferred from the microprocessor 58 to the CODEC 104 is written over data bus 231 to a data latch 232 when the microprocessor receives a second interrupt signal as described hereinbelow. The data byte in data latch 232 is loaded into a parallel-in/serial-out register 233 in synchronism with the byte clock $\overline{OLD}$. The data bits are clocked out of register 233 serially with the 64 kilohertz clock BCK and into an alternate mark driver circuit 234. The alternate mark driver circuit 234 generates the dual data outputs SO P and SO M. The dual output data signals are generated such that when the serial data into the alternate mark driver 234 is a logical zero both SO P and SO M will be a logic zero, e.g., zero bolts. The first time that the output data becomes a logical one, either SO P or SO M will switch to a logic high level, for example, +5 v. The next time that the output data is a logical one, the other signal SO M or SO P switches to the high level.

Timing circuits 235 are provided in the bidirectional converter 222 for the providing various timing signals, for example, $\overline{OLD}$ and ICK which are derived from the input clock signals, $\overline{BCK}$ and $\overline{FSC}$.

A control latch 236 receives and decodes a control code received from the microprocessor on bus 231. The control code is used to set such functions as the loopback function, a disable C function which is realized by the AND-gate 237, and data rate selection. The loopback function causes data being read by the microprocessor 58 to be written directly into the data latch 232 and then to parallel-in/serial-out register 233. The disable C function can be used to control the value of the eighth received bit of the incoming data word. Control signal $\overline{RD}$ is transmitted by the microprocessor to enable data in the tristate buffers array 230 to be put on the bus 231. Similarly, control signal $\overline{WRD}$ is sent by the microprocessor to enable latch 232 to accept data from the microprocessor. The signal $\overline{WIO}$ is used to enable the control latch 236 to receive the control code from the microprocessor.

Figure 5:
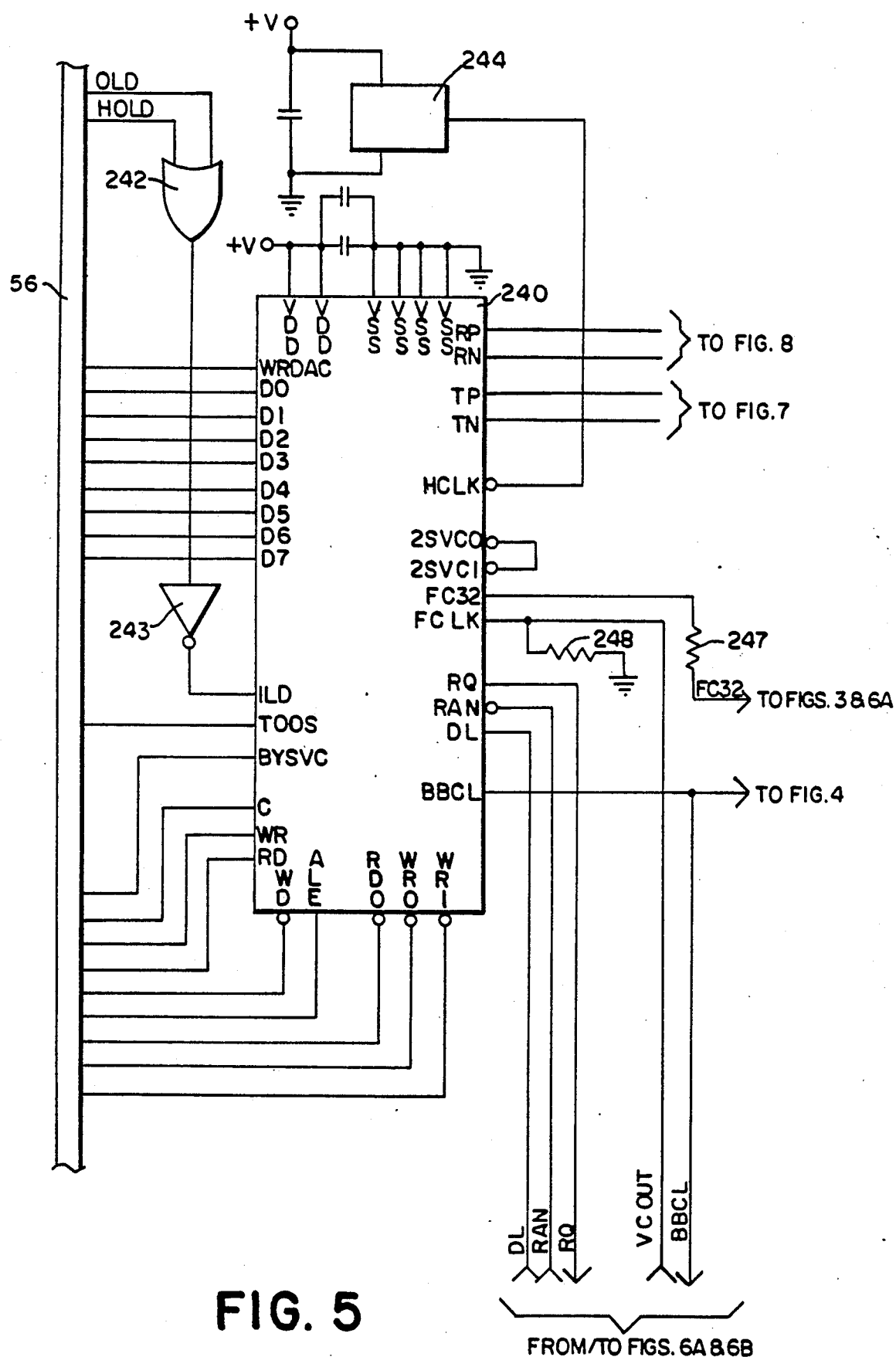
FIG. 5 is a schematic diagram of the external connections to the control logic section of FIG. 2.

Referring now to FIG. 5 there is shown a preferred arrangement for the control logic 60 of the analog data station terminal according to the present invention. The major functional subsections of the control logic, including the RTZ encoder and decoder, loop clock recovery circuit, synchronous sampling circuit, and bidirectional serial-parallel converter are configured in an integrated circuit 240.

Address or data signals are input from and output to the bus 56 at the data ports D0–D7. An OR-gate 242 having its two inputs connected to the bus 56 to receive signals $\overline{OLD}$ from CODEC 104 and HOLD from the microprocessor 58 has its output connected to the input of an inverter 243 the output of which is connected to the ILD input of integrated circuit 240. A reference clock 244 has its output connected to the HCLK input port of the integrated circuit 240 for providing a reference clock signal for use in timing recovery and to generate various other clock signals used by the control logic 60 and other sections of the ADST.

Figure 6A:
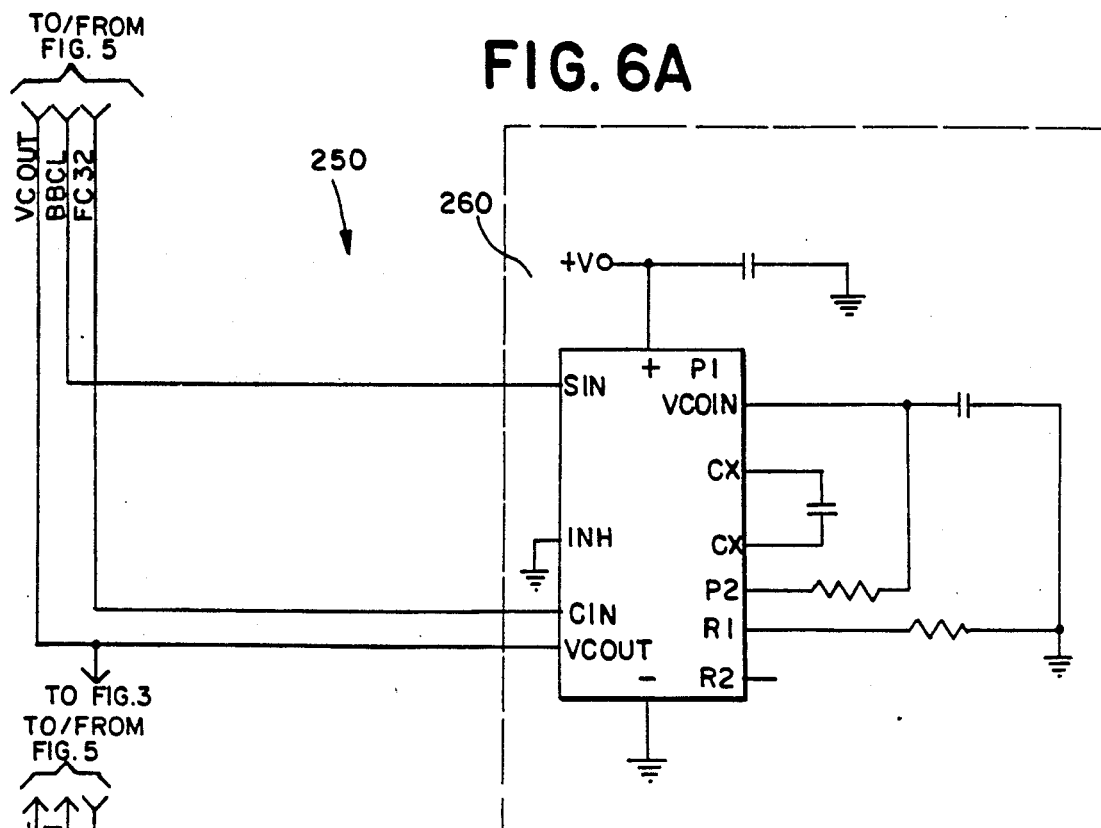
FIG. 6A is a partial schematic diagram of a voltage controlled oscillator with phase locked loop used in the control logic section of FIG. 2.

Referring now to FIGS. 5 and 6A, a voltage control oscillator 260 with phase locked loop (VCO/PLL) circuit is used to provide a 2.048 megahertz clock for use by the integrated circuit 208 of FIG. 3. The VCO/PLL 260 receives a clock signal BBCL from the integrated circuit 240 at input terminal SIN. The 2.048 megahertz clock is output at terminal VCOUT to the integrated circuit 208 and to the FCLK input of integrated circuit 240. The 2.048 Mhz clock is counted down in integrated circuit 240 to a frequency equal to that of signal BBCL. The counted down clock signal is output at terminal FC32 of integrated circuit 240. The signal output at FC32 is input to the CIN terminal of the VCO/PLL 260. In the preferred mode of operation the rate of clock signal BBCL is 64 kilohertz. As is well known, the VCO/PLL 260 functions to maintain a fixed phase relationship between BBCL and FC32 by adjusting the frequency of the signal provided at VCOUT.

Figure 6B:
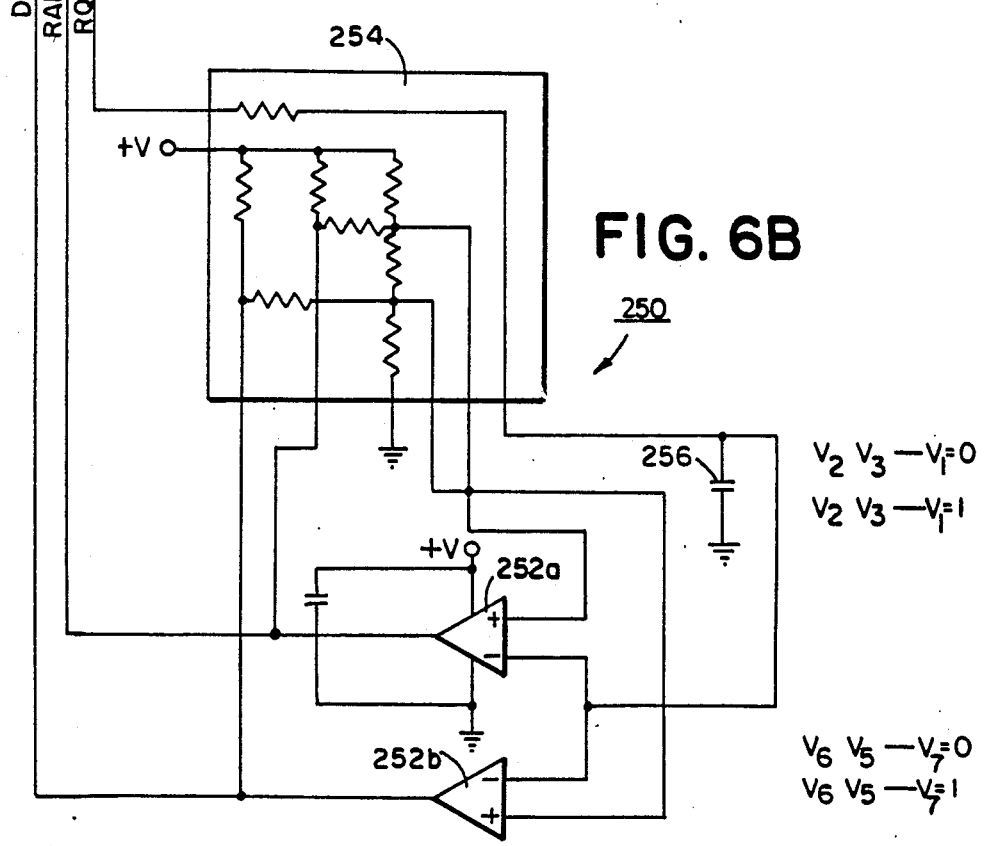
FIG. 6B is a schematic diagram of a clock phase test circuit used in the control logic section of FIG. 2.

A clock phase test circuit 250 shown in FIG. 6B is connected to integrated circuit 240 at the ports RQ, RAN, and DL. The clock phase test circuit 250 includes the dual comparators 252a and 252b a resistive network 254 and capacitor 256. The non-inverting inputs of comparators 252a and 252b are connected to the RQ output terminal of integrated circuit 240 through the resistive network 254 and filter capacitor 256. The outputs of comparators 252a and 252b are input to the RAN and DL terminals respectively of integrated circuit 240 respectively. As will be described more fully hereinbelow, the clock phase test circuit 250 is utilized in conjunction with the timing recovery circuits in integrated circuit 240 to recover the customer loop bit clock.

Figure 5A:
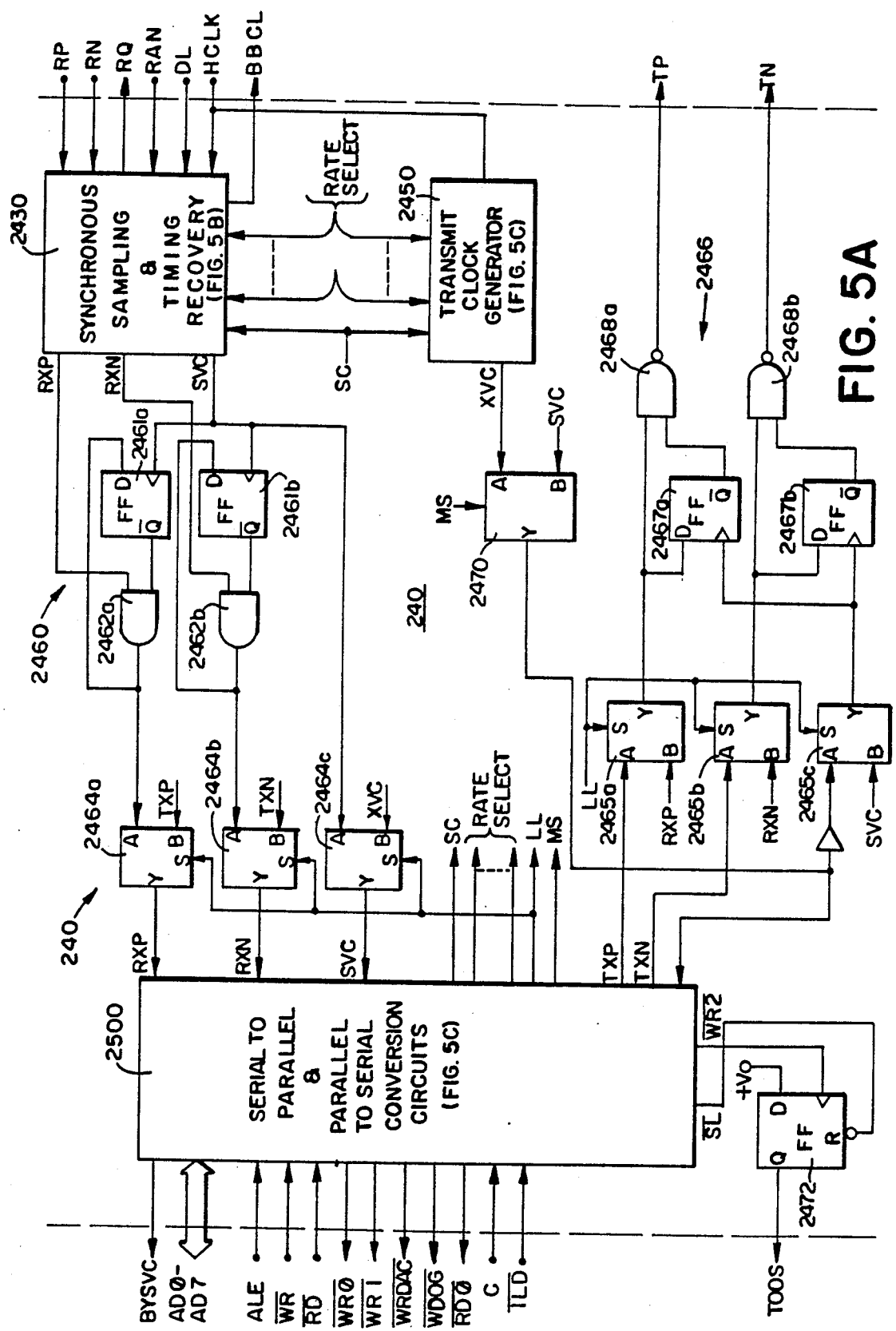
FIG. 5A is a partial schematic diagram of a preferred configuration of the control logic circuit of FIG. 5.

Referring now to FIG. 5A there is shown a preferred embodiment for the logic circuits configured in integrated circuit 240. Integrated circuit 240 includes a synchronous sampling and timing recovery circuit 2430 which receives the dual rail signals RP and RN for bipolar receiver 64. The synchronous sampling and timing recovery circuit 2430 also receives the reference clock signal HCLK.

Figure 5B:
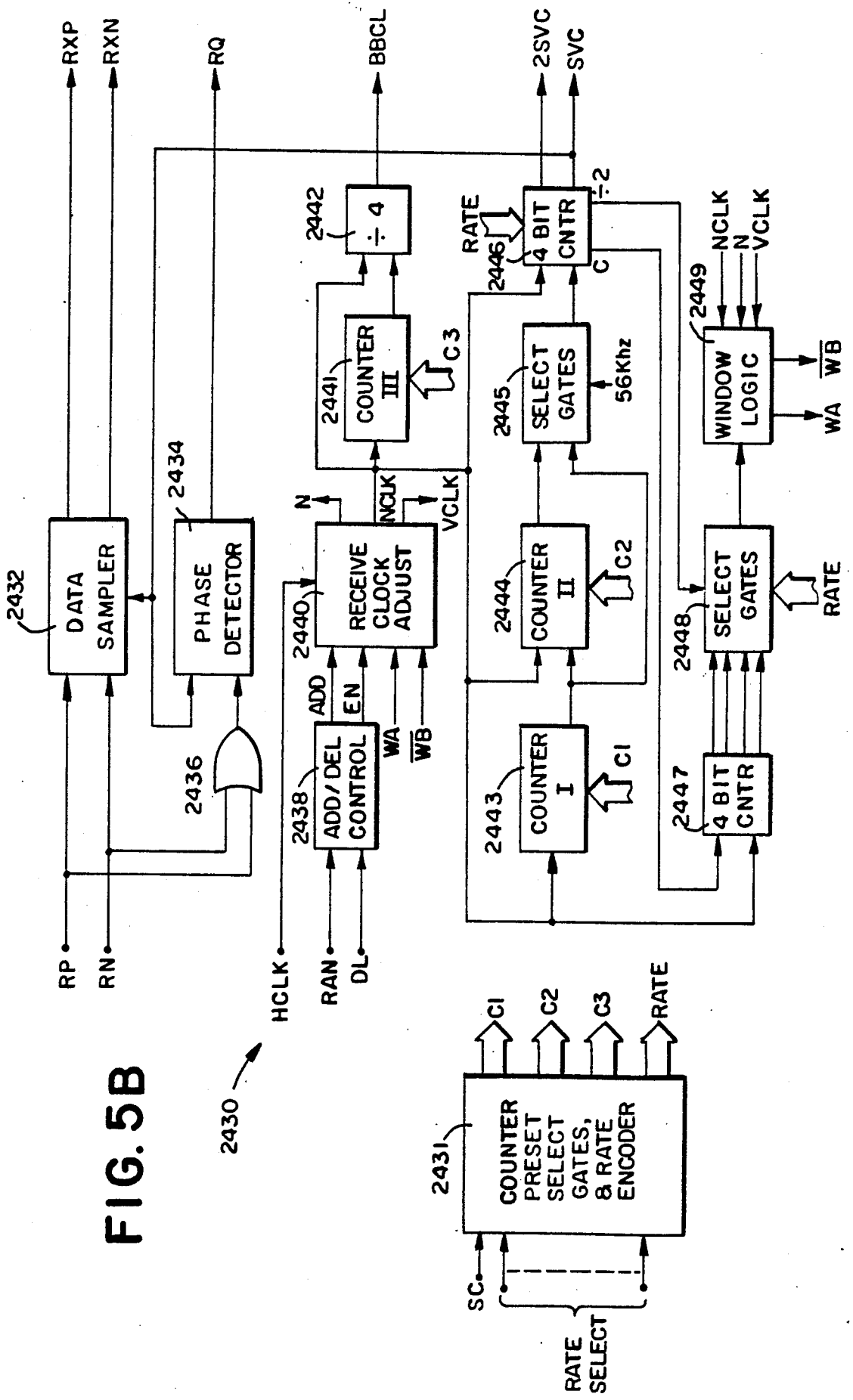
FIG. 5B is a block diagram of a preferred configuration for the synchronous sampling and timing recovery circuit of FIG. 5A.

In FIG. 5B there is shown a preferred configuration for the synchronous sampling and timing recovery circuit 2430. A buffer 2431 receives and holds the decoded rate selection signals and a secondary channel signal SC and provides coded signals for the counters and gate selection circuits of the synchronous sampling and timing recovery circuit 2430.

A data sampler 2432 receives the dual rail signals RP and RN, samples the incoming rail signals at a frequency represented by a recovered loop clock signal SVC, and generates the synchronized rail signals RXP and RXN.

A phase detector 2434 receives the incoming rail signals RP and RN through OR-gate 2436 and the recovered customer loop bit clock signal SVC and outputs a signal RQ that is representative of the phase difference, if any, between the rail signals RP or RN and the recovered customer loop bit clock signal SVC. As previously discussed, the signal RQ is input to the clock phase test circuit 250 where it is processed to provide clock control signals RAN and DL. The clock phase test circuit 250 is configured to determine the amount of phase difference and type (leading or lagging). The signals RAN and DL are used to control the adjustment of the receiver clock recovery circuit to maintain phase alignment between the received pulses and the recovered clock. In this regard, the signals RAN and DL are input to an add/delete pulse control circuit 2438 where they are converted to add pulse (ADD) and delete pulse (EN) signals that are input to a clock adjustment circuit 2440. The reference clock signal HCLK is also input to clock adjustment circuit 2440 as well as the signals WA and WB which are related to the frequency with which pulses are added or deleted from the recovered clock. The outputs from adjustment circuit 2440 include the signal N which is a clock signal at one-half the frequency of the HCLK reference clock, VCLK which is at the same frequency as HCLK, and NCLK which is at the same frequency as signal N but which has been modified by having pulses added or deleted in accordance with signals EN or ADD.

To obtain the recovered network bit clock BBCL one of the outputs, NCLK, of adjustment circuit 2440 is input to a counter 2441 which receives a preset code C3 from the buffer 2431. Counter 2441 generates a signal counted down in a divide-by-four counter 2442 which also receives the adjusted clock signal NCLK from adjustment circuit 2440. The divide-by-four circuit 2442 provides the recovered network bit clock signal BBCL at the desired frequency, preferably 64 kilohertz. Thus, for example, if HCLK has a frequency of 4.608 Mhz, then counter 2441 is preset as a divide-by-nine counter.

The recovered customer loop bit clock SVC is obtained by counting down the adjusted clock signal NCLK from adjustment circuit 2440. Clock signal NCLK is input to a counter 2443 which also receives a preset code C1 from buffer 2431. The output of counter 2443 is input to a second counter 2444 which receives the adjusted clock signal NCLK and a preset code C2 from buffer 2431. The output of counter 2444 together with the output of counter 2443 are input to a reconfigurable combinational logic circuit 2445 the output of which is input to a 4-bit counter 2446. The signal NCLK from adjustment circuit 2440 is also input to the 4-bit counter 2446 as well as a rate code from buffer 2431. The output of 4-bit counter 2446 is the recovered loop clock signal SVC which in the preferred embodiment is 72 kilohertz. The clock signal 2SVC which is at twice the frequency of recovered clock signal SVC is also output by the four bit counter 2446. In order to provide the 72 khz loop clock, counter 2443 is preset as a divide-by-four counter, counter 2444 is preset as a divide-by-one counter and 4-bit counter 2446 is preset as a divide-by-eight counter.

The pulse add/delete frequency signals WA and $\overline{WB}$ are generated as follows. The carry bit from 4-bit counter 2446 is input to another 4-bit counter 2447 together with the adjusted clock signal NCLK. 4-bit counter 2447 has its output connected to the input of a reconfigurable combinational logic circuit 2448 which receives a rate code from buffer 2431 and a half-rate clock signal from 4-bit counter 2446. The output of combinational logic circuit 2448 is input to the window logic circuit 2449 which also receives the adjusted clock signal NCLK and the reference clock signals N and VCLK to provide the add/delete pulse rate signals WA and $\overline{WB}$ for input to the clock adjustment circuit 2440.

Referring back to FIG. 5A a transmitter clock generator 2450 generates a transmitter bit clock SVC at the customer loop bit rate, e.g., 72 kilohertz, in a manner similar to the generation of the customer loop bit clock SVC.

The dual, synchronous rail signals RXP and RXN and the recovered loop clock signal SVC from the synchronous sampling and timing recovery circuit 2430 are input to an error correction circuit 2460. The error correction circuit 2460 functions to prevent successive binary 1 signals on each rail and includes a pair of flip-flops 2461a and 2461b which have their inverting outputs connected to one of the inputs of AND-gates 2462a and 2462b respectively. The other inputs of AND-gates 2462a and 2462b receive the synchronized rail signals RXP and RXN respectively. The outputs of the AND-gates 2462a and 2462b are connected to the D inputs of the flip-flops 2461a and 2461b respectively. The recovered clock signal SVC is provided to the clock inputs of flip-flops 2461a and 2461b.

After error correction, the rail signals RXP and RXN are input to the A terminals of loopback selectors 2464a and 2464b respectively. The recovered loop clock signal SVC is input to the A terminal of loopback selector 2464c. The B terminals of loopback selectors 2464a and 2464b are connected to receive the transmit rail signals TXP and TXN respectively and the B terminal of loopback selector 2464c is connected to receive the transmitter clock XVC. The select terminals of the loopback selectors 2464a-c are connected to receive a decoded loopback signal LL. The Y outputs of the loopback selectors 2464a-c are connected to the input ports of the serial to parallel and parallel to serial conversion circuits 2500. As will be described more fully hereinbelow, the serial to parallel and parallel to serial conversion circuits 2500 perform serial-to-parallel conversion on the bit stream received from the central office over the customer loop line as well as parallel-to-serial conversion of data bytes to be transmitted to the central office over the customer loop line. The conversion circuits 2500 also receive data, address, and input/output control signals from the microprocessor and provide various control signals to other stages of the analog data station terminal including the microprocessor.

Figure 5C:
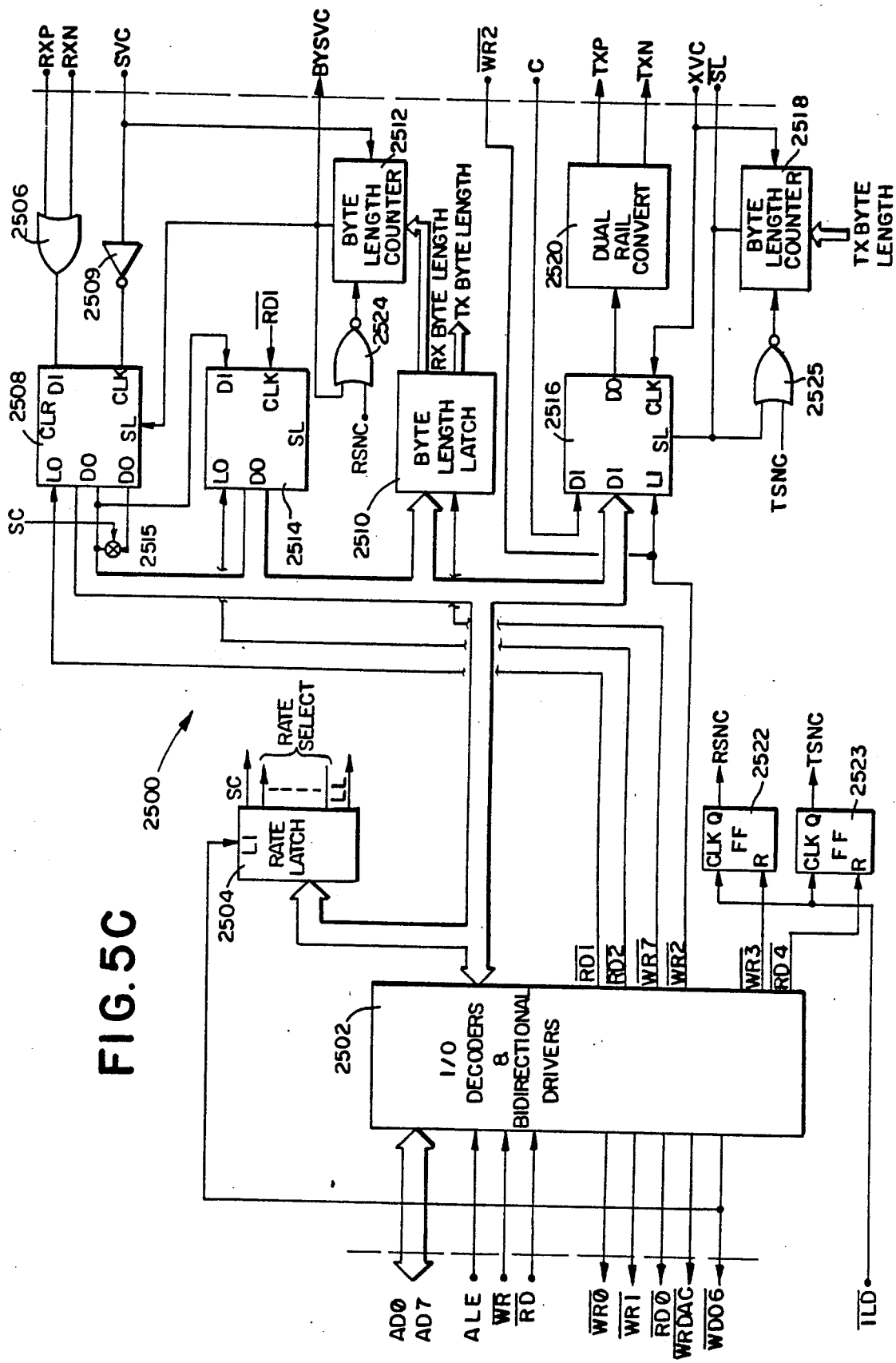
FIG. 5C is a partial schematic diagram showing a preferred configuration for the serial-to-parallel and parallel-to-serial conversion circuits of FIG. 5A.

A preferred arrangment for the serial-to-parallel and parallel-to-serial conversion circuits are shown in FIG. 5C. The conversion circuits 2500 include a microprocessor bus interface 2502 comprising input/output decoders and bidirectional drivers. The input/output decoding circuits of interface 2502 are configured in accordance with the type of microprocessor used, as is well known. The interface circuit 2502 receives the address/data signals AD0 to AD7 and the input/output control signals ALE, $\overline{WR}$, and $\overline{RD}$ from the microprocessor via bus 56. The signal ALE enables the interface circuit 2502 to latch an address from the microprocessor, whereas the signals $\overline{WR}$ and $\overline{RD}$ enable a data byte to be written to or read from the interface circuit 2502 by the microprocessor. The interface circuit 2502 outputs signals $\overline{WR0}$, $\overline{WR1}$, $\overline{RD0}$. $\overline{WRDAC}$, and $\overline{WDOG}$ which are decoded read or write pulses provided to other sections of the analog data station terminal. For example, the write signals $\overline{WR0}$, $\overline{WR1}$, and the read signal $\overline{RD0}$ are provided to the bidirectional converter 222 of FIG. 4. The write signal $\overline{WRDAC}$ is provided to the bipolar receiver 146 as described more fully below. Similarly, the watchdog pulse $\overline{WDOG}$ is provided to the microprocessor section 132. As shown in FIG. 5C the signal $\overline{WDOG}$ is also provided to a rate latch 2504 for loading the decoded rate selection and function codes into the rate latch 2504.

In the preferred mode of operation the dual rail signals RXP and RXN are OR'd in gate 2506 to provide a serial data stream to the data input terminal of serial-in/parallel-out device 2508. A byte length latch 2510 receives a byte length code from the bus interface 2502 when enabled by the write signal $\overline{WR7}$. The byte length latch 2510 provides the byte length code to the receiver byte length counter 2512. The receiver byte length counter 2512 also receives the recovered loop clock signal SVC and counts down that signal to produce the receiver byte clock signal BYSVC which is the recovered loop byte clock. The signal BYSVC is provided to the shift load terminal of the serial-in/parallel-out device 2508 to latch a data word of the appropriate byte length, preferably 9 bits and at the appropriate byte rate, preferably 8 kilohertz. As will be described more fully below the receiver byte clock signal BYSVC is output from the control logic 240 as one of the processing interrupt signals to the microprocessor 58. Upon receipt of the interrupt signal BYSVC the microprocessor signals the bus interface 250 which provides the read pulse RD1 to serial-in/parallel-out device 2508 for the microprocessor to read the 8-bit data word present at the data output port of device 2508 through interface circuit 2502.

The second most recent bit that is received into serial-in/parallel-out device 2508 is clocked into a framing serial-in/parallel-out device 2514 through a switch 2515 that is enabled by the secondary channel operation signal SC. The bits are clocked into the framing serial-in device 2514 by the read signal RD1 and are accumulated there to be read later by the microprocessor in order to determine byte alignment within the serial bit stream received from the central office. The framing bits are read by the microprocessor in connection with read pulse $\overline{RD2}$ after every sixth byte read from serial-in device 2508, in other words, on every sixth RD1 read pulse.

Data bytes to be transmitted to the central office are loaded from the bus interface 2502 into a parallel-in/serial-out device 2516 with the write pulse WR2 from interface circuit 2502. A byte to be transmitted preferably consists of seven data bits plus a framing bit provided by the microprocessor and a ninth or control bit which is provided separately from the C terminal of the control logic conversion circuits 2500 by the microprocessor. The control bit is combined with the 8-bit byte from the microprocessor, preferably in the least significant bit position, and shift loaded to the serial-out latch of device 2516 upon receipt of the shift load signal $\overline{SL}$ from the transmitter byte length counter 2518. The transmit byte length counter 2518 operates in a manner similar to the receive byte length counter 2512. In this regard it receives a transmitter byte length code from the byte length latch 2510. It counts the transmitter bit clock signal XVC in accordance with the transmitter byte length code to provide the shift load signal $\overline{SL}$ to the parallel-in/serial-out device 2516. The data bits are clocked out serially at the transmitter clock rate signal XVC to a dual rail conversion circuit 2520 from which they are output from conversion circuit 2500 as rail signals TXP and TXN at the transmitter bit clock rate.

In order to ensure that byte length counters 2512 and 2518 start and remain in synchronism, a hold or resynch function is provided. To this end a flip-flop 2522 is connected to receive a write signal $\overline{WR3}$ at its reset input and a stop/start signal $\overline{ILD}$ at its clock input. Flip-flop 2522 provides a signal RSNC from the non-inverted output to one of the inputs of a NOR-gate 2524. The other input of NOR-gate 2524 is connected to receive the recovered loop byte clock signal BYSVC.

Similarly, a flip-flop 2523 is connected to receive a read signal $\overline{RD4}$ its reset terminal and the start/stop signal $\overline{ILD}$ at its clock terminal. The non-inverted output of flip-flop 2523 provides a signal TSNC to one of the inputs of a NOR-gate 2525. The other input of NOR-gate 2525 is the shift load signal $\overline{SL}$.

The synchronization/resynchronization logic becomes operative during initial startup and when the transmitter section is indicated to be out of synchronism. The signal $\overline{ILD}$ changes the state of the flip-flops 2522 and 2523 to provide the signals RSNC and TSNC respectively. The presence of signals RSNC and TSNC at the inputs of respective NOR gates 2524 and 2525 causes the byte length counters 2512 and 2518 to stop counting. The counter presets are reset to the desired byte length, e.g., 9 bits/byte. After an appropriate time delay, the signals $\overline{WR3}$ and $\overline{RD4}$ reset or arm the synchronization flip-flops 2522 and 2523 respectively, thereby restarting the byte length counters 2512 and 2518. In this manner, the byte length counters 2512 and 2518 can be controlled to ensure that they operate in synchronism.

Referring back to FIG. 5A, the dual, transmitter rail signals TXP and TXN are input to the A terminals of respective loopback selectors 2465a and 2465b. The B inputs of loopback selectors 2465a and 2465b are connected to receive the receiver dual rail signals RXP and RXN. The select input terminals of selectors 2465a and 2465b are connected to receive the decoded loopback signal LL for switching to loopback operation.

A duty cycle limiter 2466 includes a pair of flip-flops 2467a and 2467b, and a pair of NAND-gates 2468a and 2468b.

The output terminals of selectors 2465a and 2465b are connected to the data inputs of flip-flops 2467a and 2467b respectively as well as to one of the inputs of NAND-gates 2468a and 2468b respectively. The clock inputs of flip-flops 2467a and 2467b receive the transmitter clock signal XVC or the recovered clock signal SVC as selected by selector 2470. The inverted outputs of flip-flops 2467a and 2467b are provided to the respective second inputs of NAND-gates 2468a and 2468b. The outputs of the NAND-gates 2468a and 2468b terminate at the control logic interface to provide the transmitter rail signals TP and TN with a 50% duty cycle to the bipolar output circuit.

After startup and during normal operation of the ADST a transmitter-out-of-synch condition is indicated to the microprocessor 132 by the signal TOOS. As shown in FIG. 5A, a flip-flop 2472 is connected to receive the shift load signal $\overline{SL}$ at its clock or trigger input, and to receive the write signal $\overline{WR2}$ from conversion circuit 2500 at its reset input. The D input is biased positive. Thus, the output signal TOOS at the non-inverted output of flip-flop 2472 is a logic high after a data byte is loaded into the parallel-in/serial-out device 2516. TOOS is switched to a logic low when the data byte loaded into the parallel-in section of device 2516 is shifted to the serial-out section thereof, that is when $\overline{SL}$ resets flip-flop 2472. An out-of-synch condition may exist if the microprocessor attempts to write the next data byte into device 2516 while TOOS is still a logic high. If TOOS remains high for more than a desired length of time while the microprocessor attempts to write the next data byte to device 2516, an out-of-synch condition is declared by the microprocessor, and the resynchronization logic described above becomes operative.

Figure 7:
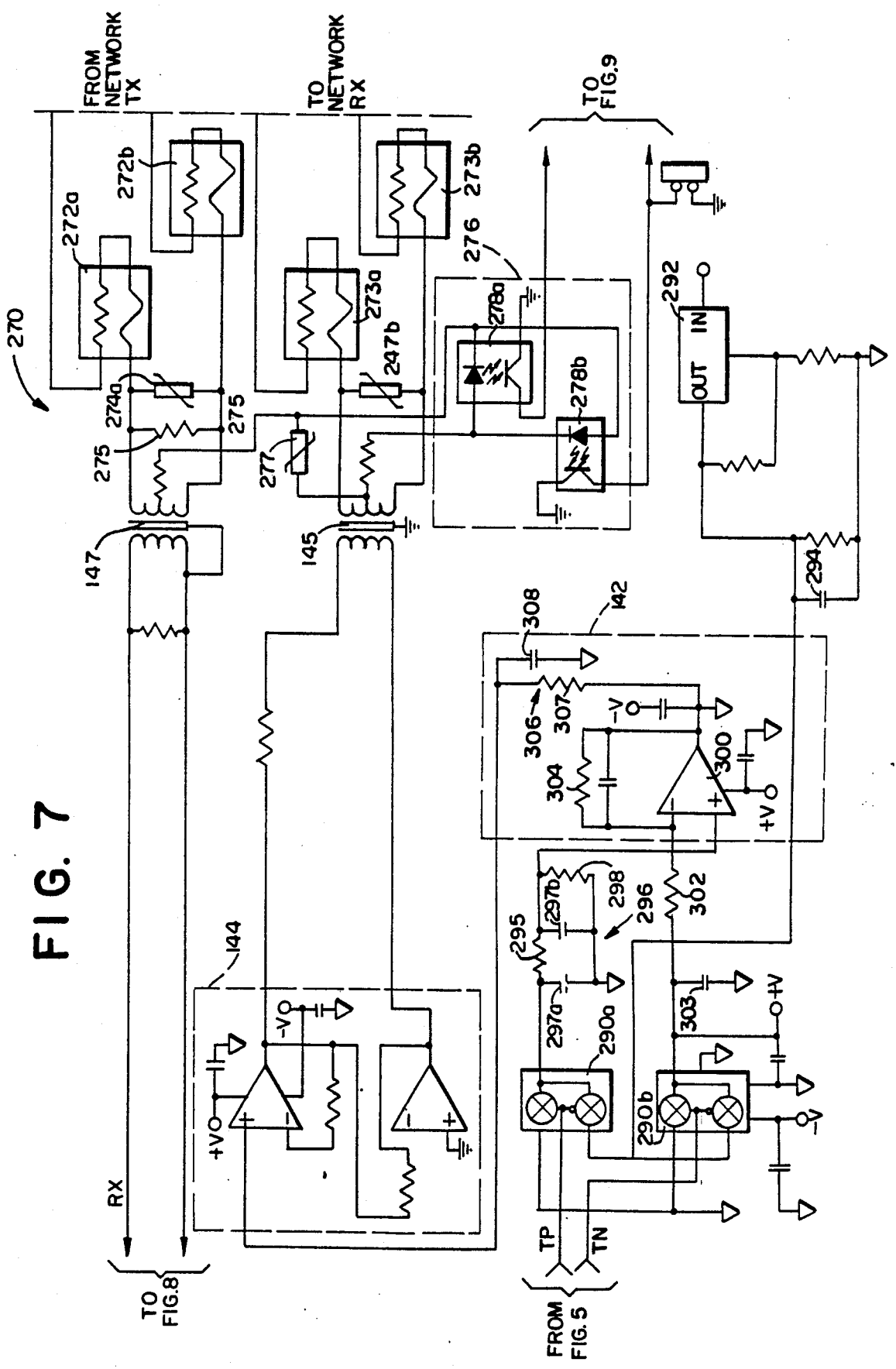
FIG. 7 is a schematic diagram of the bipolar transmitter section of the analog data station terminal of FIG. 2.
Figure 8:
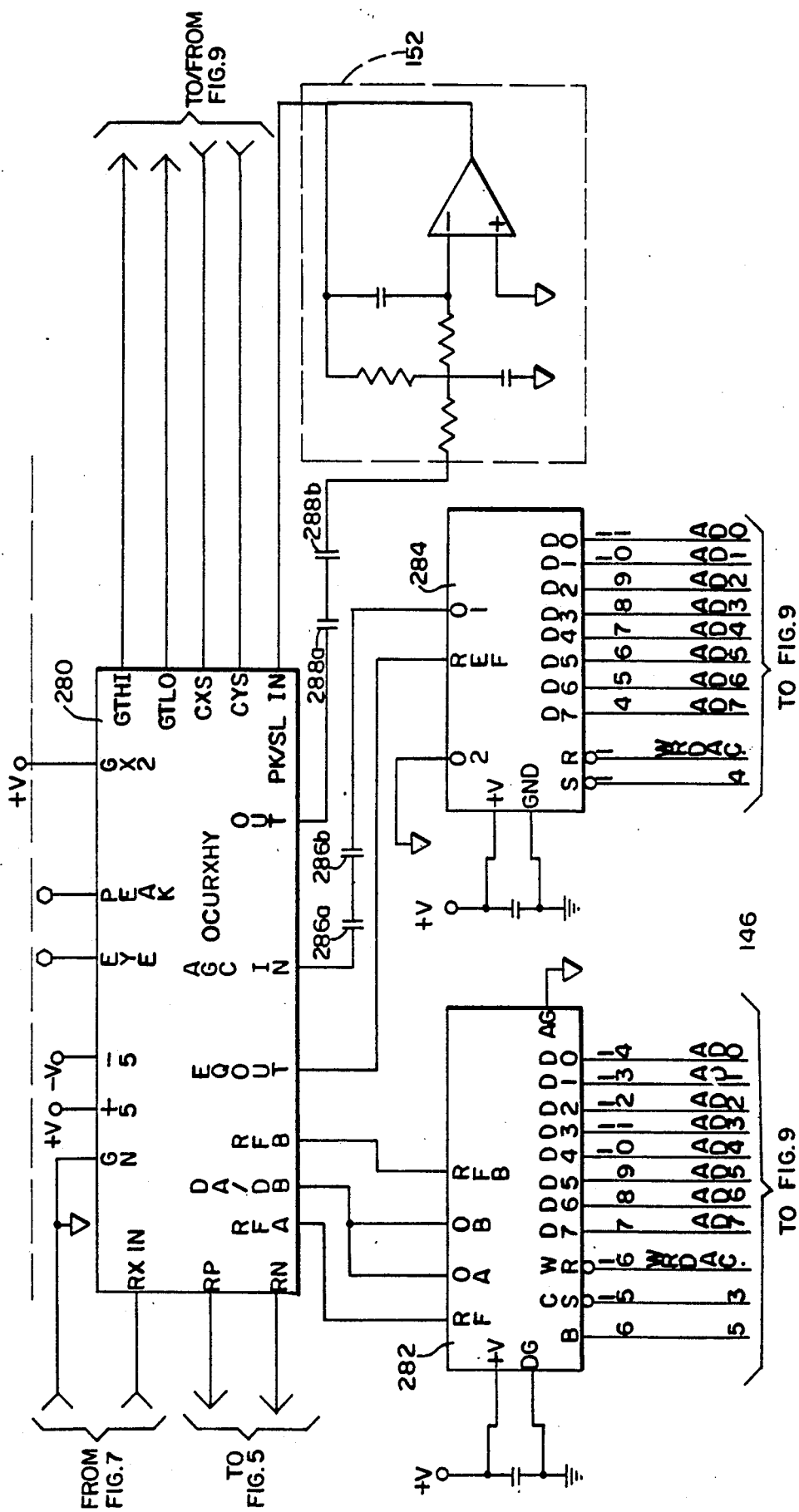
FIG. 8 is a schematic diagram of the bipolar receiver circuit in the analog data station terminal of FIG. 2.

Referring now to FIGS. 7 and 8 there are shown preferred configurations for the bipolar receiver 64 and bipolar transmitter 62 of the analog data station terminal according to the present invention. In FIG. 7 the customer loop interface 270 includes the fused resistors 272a and 272b on the receiver terminals, T and R. Similarly, fused resistors 273a and 273b are connected to the transmitter terminals, T1 and R1. Surge protection devices 274a and 274b are connected across the receiver terminals and transmitter terminals respectively. A resistor 275 is connected across the receiver terminals to provide the desired impedance. The receiver terminals are connected across one winding of the coupling transformer 147 and the transmitter terminals are connected across one of the windings of coupling transformer 145.

A sealing current circuit 276 is connected across the center taps of the coupling transformers 145 and 147. The sealing current circuit includes a surge protector 277 and a pair of optoelectronic devices 278a and 278b. Optoelectronic device 278a is connected to detect the presence of sealing current in the circuit 276 and provides the signal ISX to the microprocessor when normal sealing current is present. Optoelectronic device 278b is connected to detect a reversal of the sealing current in the circuit 276 and provides the signal LPB to the microprocessor when the sealing current is reversed in polarity. As is well known, sealing current direction or polarity is used to initiate loopback operation.

The serial data received from the customer loop is transmitted through coupling transformer 147 and applied to the RX input of the integrated bipolar receiver circuit device 280 shown in FIG. 8. The integrated circuit device 280 of bipolar receiver 64 is configured to provide equalization, automatic gain control, peak detection and bit slicing functions as shown in FIG. 2A. A dual bank digital/analog resistor 282 is connected to the RFA and RFB inputs of the equalizer stage of integrated circuit device 280. A single bank digital/analog resistor 284 is connected to the AGC input terminal of integrated circuit device 280. The values of the digital/analog resistors 282 and 284 are set by the microprocessor with 8-bit codes (D0-D7) transmitted via bus 56. The resistor value codes are written by the microprocessor to the desired resistor bank with an identification code (A13-A15) and the write signal $\overline{WRDAC}$.

A pair of coupling capacitors 286a and 286b couple the output from the EQOUT port to the REF port of bank digital/analog resistor 284. The low pass filter 152 receives equalized and amplified signals from the AGC OUT port through coupling capacitors 288a and 288b. The filtered signal is applied to the peak selector input terminal (PK/SL IN) of integrated circuit device 280. The capacitor select signals CXS and CYS from the microprocessor are provided to the respective input ports of integrated circuit device 280. The GTHI and GTLO signals from the peak detector stage of circuit device 280 are output to the microprocessor to indicate whether the received signal is within preselected amplitude limits.

The dual receiver rail signals RP and RN are output from the integrated circuit device 280 at the terminals RP and RN respectively for input to the sampling and decoding circuits in the control logic 60. The configuration and operation of the bipolar receiver circuit 64 is disclosed in U.S. Pat. No. 4,759,035 which is incorporated herein by reference.

Referring back to FIG. 7, the transmit rail signals TP and TN from the control logic 60 are input to the switching inputs of analog switches 290a and 290b respectively. One of the switched inputs of each of the analog switches 290a and 290b is connected to ground. The other switched input is connected to the output of a voltage regulator 292 at the positive terminal of filter capacitor 294. With this configuration, the outputs of the analog switches 290a and 290b provide a stable voltage level for a logic one when the respective rail signal is high and a zero voltage level when the respective rail signal is low. The output of analog switch 290a is provided to the level set and shaping filter circuit 142 via a feed-through resistor 295 and RC network filter 296 including capacitors 297a and 297b and resistor 298. The output of analog switch 290b is provided to the level set and shaping filter circuit 142 through resistor 302 and filter capacitor 303.

The output of analog switch 290a is connected to the non-inverting input of an amplifier 300 in the level set and shaping filter circuit 142. The output of analog switch 290b is connected to the inverting input of amplifier 300. The gain of the amplifier circuit is defined by a feedback resistor 304 connected from the output terminal to the inverting input terminal of amplifier 300.

The output of amplifier 300 which is a series of positive and negative polarity pulses, is filtered for the proper roll-off characteristic in RC filter 306 including resistor 307 and capacitor 308. The output of shaping filter 306 is connected to the bipolar driver circuit 144 which is connected in a push-pull arrangement to provide the bipolar data to the network through terminals T1 and R1 in the customer loop interface 270.

Figure 9:
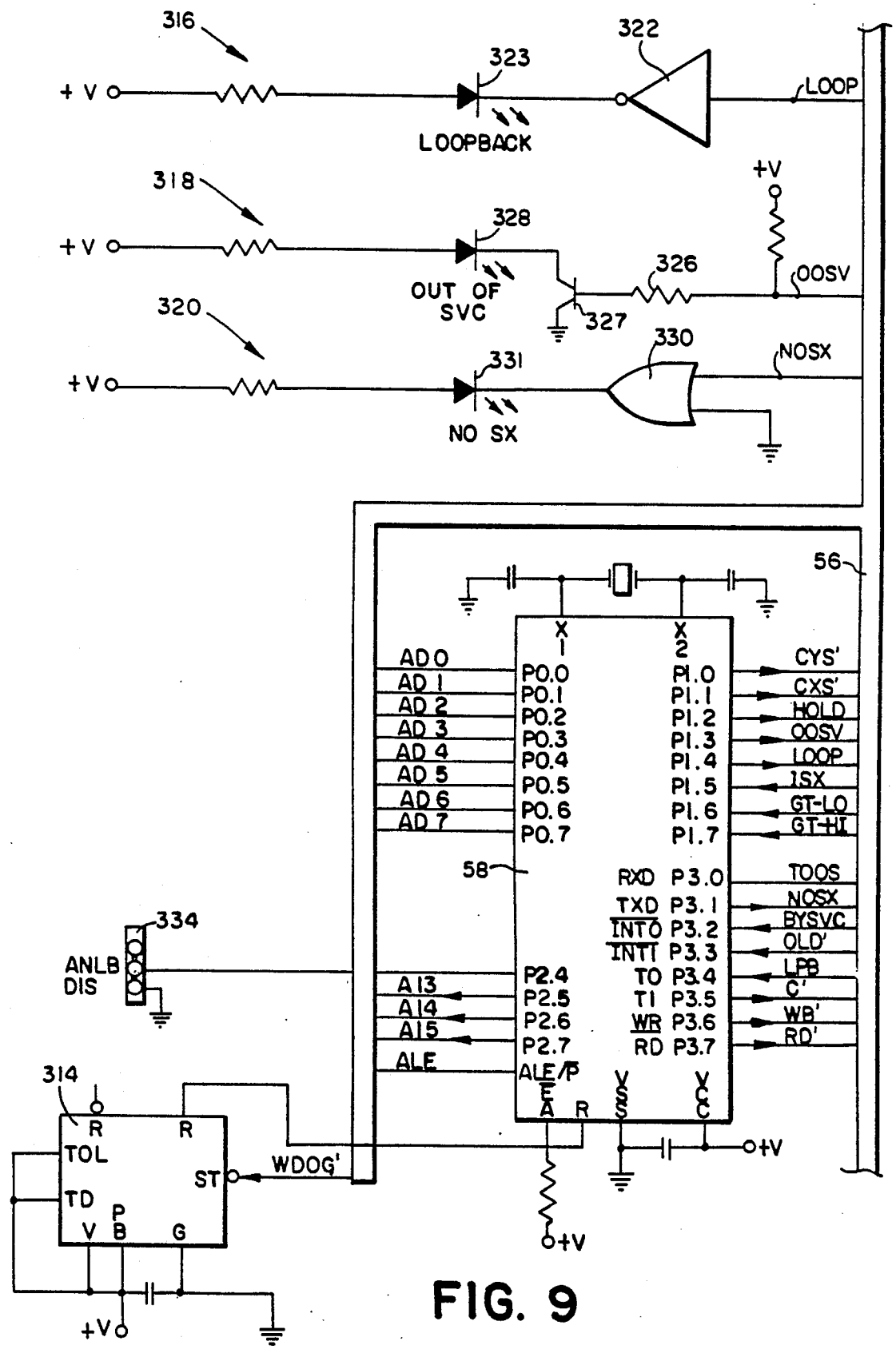
FIG. 9 is a schematic diagram of external connections to the computer shown in FIG. 2.

Referring now to FIG. 9 there is shown the preferred arrangement for the microprocessor 58 and its related circuits in the analog data station terminal according to the present invention. The data/address bus 56 is connected to the various parallel ports of the microprocessor 58 which in FIG. 8 is embodied as a Model 80C51 processor manufactured by Intel. In the embodiment shown in FIG. 9, the parallel ports P1.0 to P1.7 and P3.0 to P3.7 are used for sending or receiving input and output control signals. The ports P0.0 to P0.7 are used for sending or receiving data and address signals. The ports P2.4 to P2.7 are used for sending selection codes to the digital/analog resistors 282, 284 in bipolar receiver circuit 146 as described above, and for receiving a signal to disable the analog loopback function.

A watchdog timer 314 is connected to receive the signal WDOG from the control logic 240 through bus 56. The watchdog timer 314 is configured to generate a reset signal to reset the microprocessor 58 if the signal WDOG is not received at the ST input terminal within a preselected time period.

In connection with operation of the ADST a loopback operation indicator 316, an out-of-service indicator 318, and a no-sealing-current indicator 320 are provided. In the loopback operation indicator an inverter 322 receives a signal LOOP from the microprocessor. The output of inverter 322 turns on the LED 323 thereby causing it to illuminate when the ADST is in loopback operation.

The out-of-service indicator is made operative by an out-of-service signal OOSV from the microprocessor when no signal is detected from the customer loop. The signal OOSV is provided through resistor 326 to switching resistor 327 which turns on LED 328.

When the microprocessor receives neither the ISX signal nor the LPB signal from the sealing current detector circuit 276 it provides the no-sealing-current signal NOSX to OR-gate 330. The output of OR-gate 330 turns on the LED 331 to provide an indication that no sealing current is present.

As described above, the microprocessor contains programs in its ROM that enable the microprocessor to perform the various control and data handling procedures it must perform when in operation.

Figure 10:
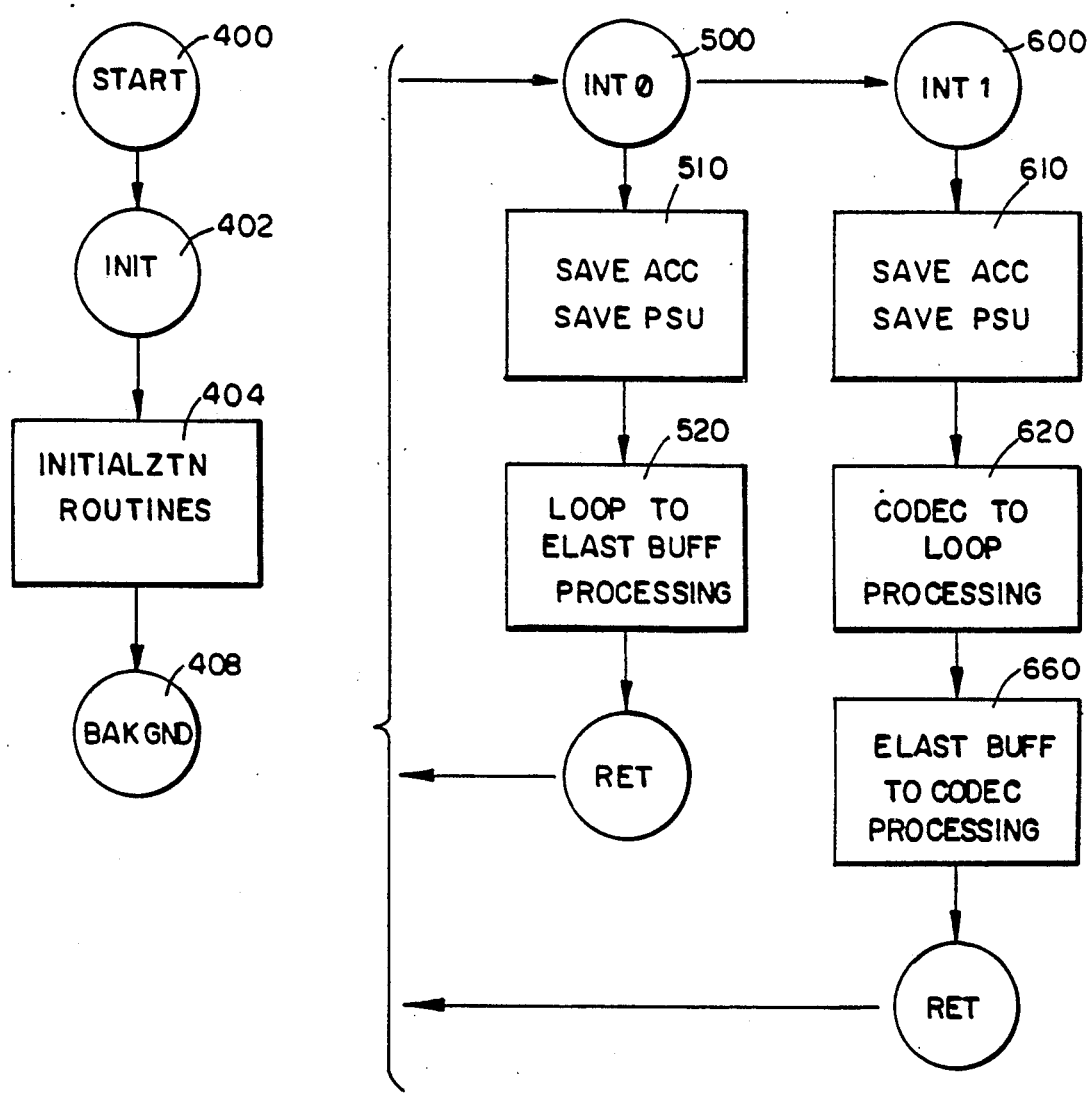
FIG. 10 is a logic flow diagram showing the main processing loops employed in operation of the analog data station terminal of FIG. 2.
Figure 11:
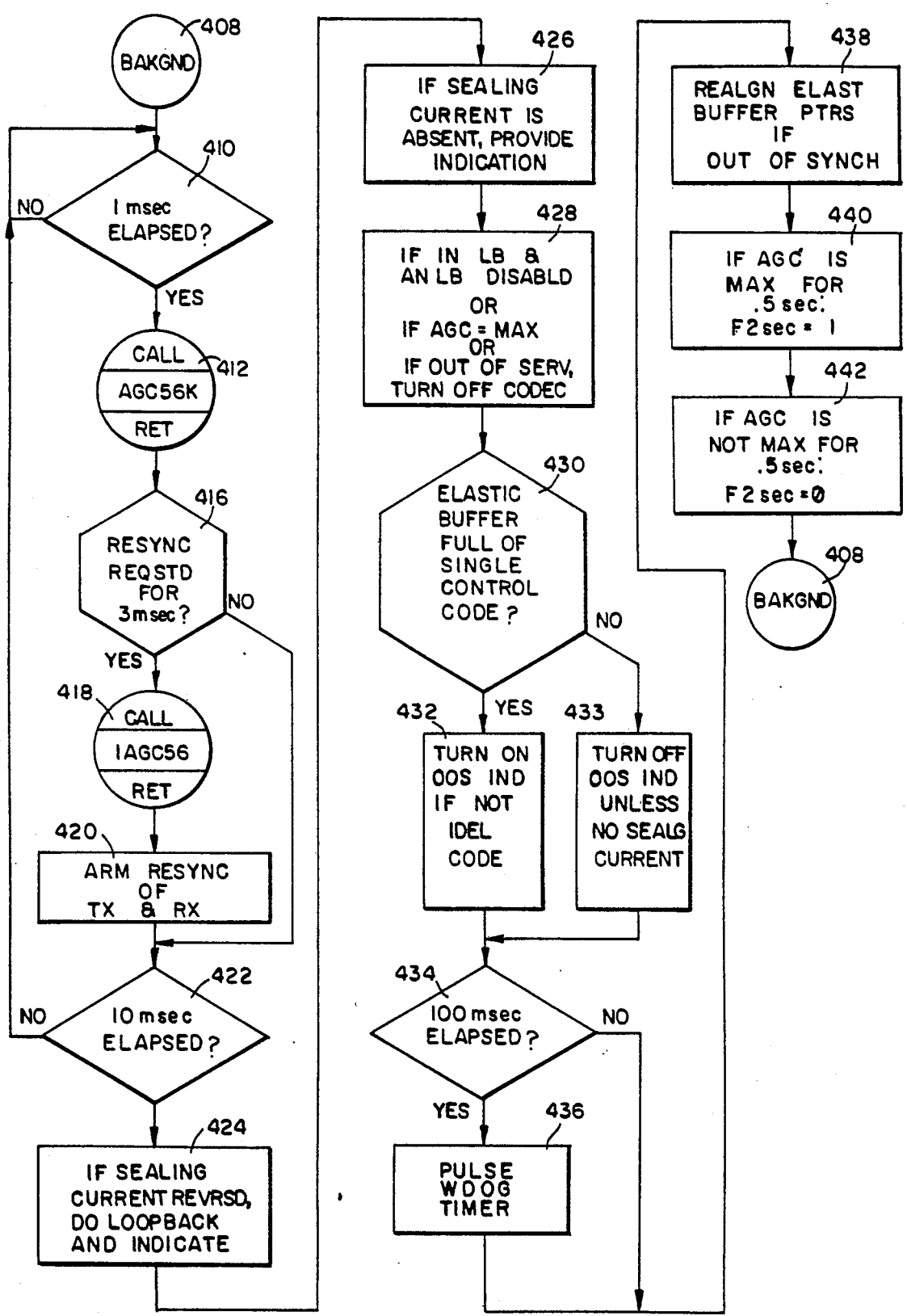
FIG. 11 is a logic flow diagram of the background processing loop shown in FIG. 10.

Referring now to FIG. 10 there are shown the principle processing loops of the software modules that control operation of the microprocessor 58. Upon power-up or reset of the microprocessor, the main process loop jumps from the start position 400 to an initialization procedure 402 identified as INIT. The initialization procedure INIT includes various initialization routines 404. Among the steps performed by the initialization routines are such known operations as the initialization of pointers, the setting of data rates and modes of operation for the control logic gates, initializing counters for byte framing, initiating byte length presets, setting RAM register banks, setting sync flags, initializing the automatic gain control and equalizer settings, and various other presets and procedures. At the end of the initialization routines 404 processing jumps to a background loop 408 (BAKGND) described below which monitors and adjusts various functions when the ADST is operating.

While operating in the background loop the microprocessor can receive an interrupt signal identified as INT0 or INT1 respectively which initiates one of the interrupt processing loops 500 or 600. The INT0 loop 500 is initiated when the microprocessor receives the customer loop byte clock signal BYSVC. The loop 500 procedure saves the current value in an internal accumulator, and the program status word at the time of the interrupt. As will be described more fully hereinbelow, the microprocessor then proceeds to transfer a data byte received from the customer loop into the elastic buffer in step 520 and to check for proper synchronization. When step 520 is completed the microprocessor returns to the background loop 408 to continue processing in that loop.

In a similar manner, when the microprocessor receives the network byte clock $\overline{\text{OLD}}$, INT1 loop 600 is initiated. In step 610 of the INT1 loop 600, the processor saves the value in the internal accumulator and the most current program status word. As described below, in step 620 the processor transfers a data byte from the bidirectional converter 222 toward the digital loop. After executing the transfer process in step 620, the processor executes step 660 to transfer the next data byte in the elastic buffer for processing by the analog generator section. When step 660 is completed, the microprocessor returns to the background loop 408.

The background loop 408 includes a sequence of steps and decisions as shown in FIG. 10 which monitor the status of the microprocessor operation and initiate certain functions of the microprocessor in accordance with procedures in the program. For instance, in step 410 the processor checks to see if a first preselected time delay, e.g., one millisecond, has elapsed since entering the background loop 408. If the appropriate amount of time has not yet elapsed the processor keeps looping until the proper amount of time has passed. When the proper elapsed time is reached, the processor calls the automatic gain control subroutine AGC56K in step 412 to make adjustments in the AGC and equalizer stages of bipolar receiver circuit 64. When processing returns from step 412, inquiry is made in step 416 whether resynchronization has been requested, as by signal TOOS being at logic high for at least a preselected amount of time, e.g., three milliseconds. If resynchronization has not been requested for the preselected amount of time, processing jumps to step 422 where a third time delay, e.g., ten milliseconds, is checked. If, in step 416, the resynchronization request has been present for at least the minimum amount of time, then in step 420 the processor sends a resynchronizing signal (HOLD) to the control logic 240 to temporarily stop the byte length counters as described above, so that they can be reset. The bipolar receiver initialization subroutine IAGC56 is called in step 418 by the processor to reinitialize the AGC and equalizer stages of bipolar receiver 146 when resynchronization has been requested for at least the preset time period. In step 420 the processor sends reset signals to arm the resynchronization flip-flops in the control logic as described above. If in step 422 the selected time delay has not elapsed, the processor loops back through steps 410, 412, 416, 418, and 420 until the selected time period has elapsed. When the time period set in step 422 has elapsed, the processor, in step 424, checks to see if the sealing current has been reversed. If the sealing current is reversed, as indicated by the signal LPB, the processor enables loopback operation of the analog data station terminal and provides an indication of that status on the appropriate LED indicator as described above. In step 426 the processor reads the signals ISX and LPB to determine if sealing current is present. If sealing current is not present, the NOSX (no sealing current) LED indicator is turned on by the microprocessor. In step 428 the processor checks for a condition for which it should turn off the CODEC/filter 104. In the loopback mode the processor turns off the CODEC/filter 104 for any one of the following conditions: 1) the analog loopback disable signal is present, 2) the gain setting of the AGC circuit is at a maximum, or 3) an out-of-service condition exists.

In step 430 the processor checks the elastic buffer to determine whether it is full of a single control code, for example, the abnormal station code or an idle code. If it is, then in step 432 the processor turns on the out-of-service (OOSV) indicator LED if the code stored in the elastic buffer is not the idle code. If the elastic buffer contains more than one control code, then in step 433 the processor turns off the OOSV indicator unless, in step 426, it was determined that there is no sealing current present.

After completing step 432 or 433 as appropriate, the microprocessor determines in step 434 whether a third time period, for example a hundred milliseconds, has elapsed since the background loop 408 was entered. If the appropriate amount of time has elapsed the microprocessor pulses the watchdog timer. However, if the appropriate time has not elapsed yet, then processing continues with step 438.

In step 438 the processor realigns the load and dump pointers in the elastic buffer if they are out of synch. In step 440 the processor determines whether the automatic gain control has been at a maximum gain setting for a preselected time, such as 0.5 seconds. If the automatic gain control has been set at maximum value for the preselected time period then the flag F2SEC is set to a binary one. Similarly, in step 442 the processor checks whether the gain setting of the automatic gain control circuit has been at its minimum setting for a second preselected time, e.g., 0.5 seconds. If the second preselected time period has passed without a change in the gain setting, then the flag F2SEC is set to zero. Upon completion of step 442 the processor loops back to the beginning of the background loop 408 and continues to execute the above-described steps until an interrupt signal is received.

The processor interrupt module 500 processes data bytes in the customer loop to modem direction. Each data byte received from the customer loop over the customer loop is read by the microprocessor from the control logic 60 and synchronized in accordance with a known byte framing pattern. The data bytes are stored in the elastic buffer for later transfer to the CODEC 104.

Figure 12:
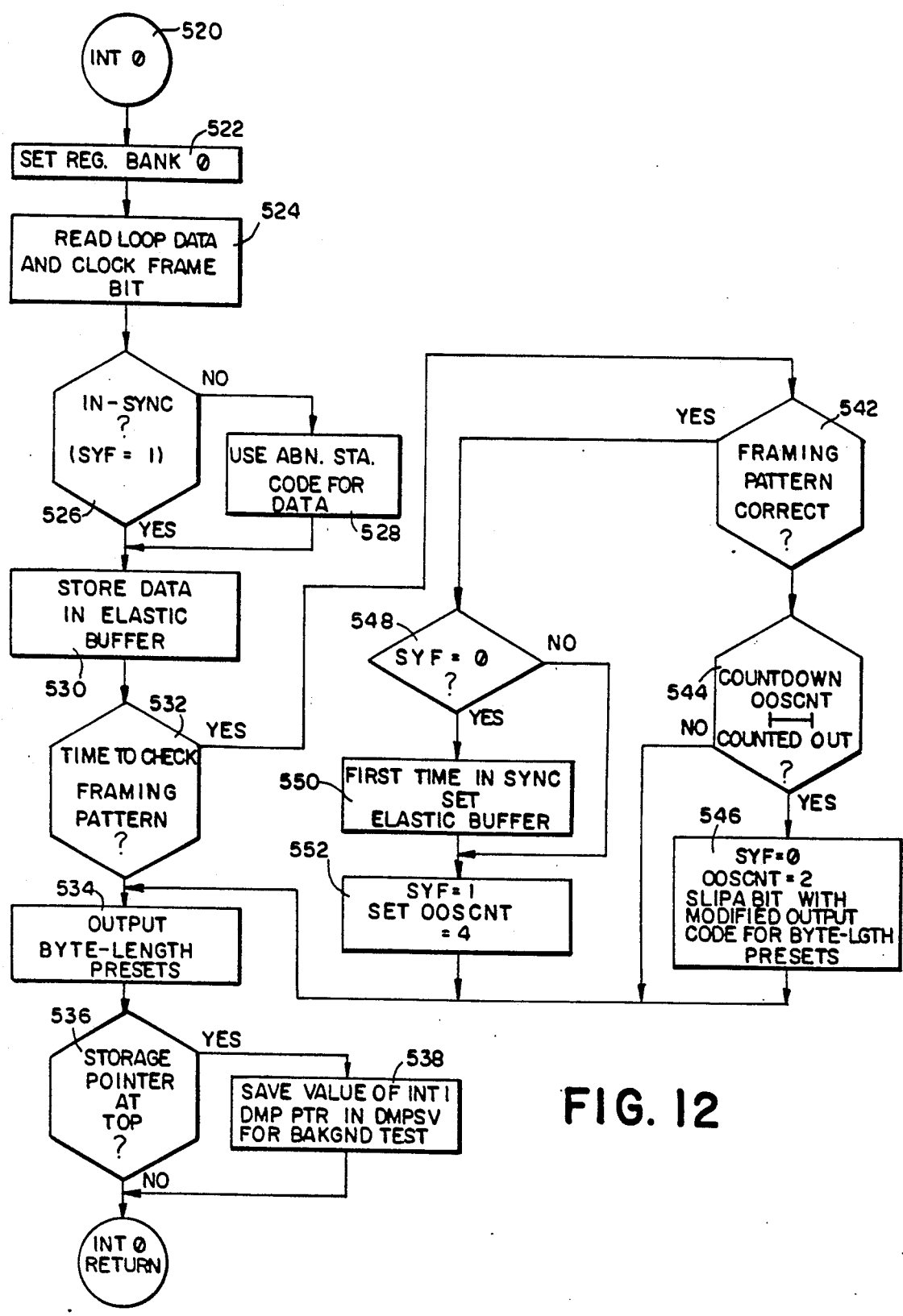
FIG. 12 is a logic flow diagram of the interrupt processing module INT0 shown in FIG. 10.

As shown in FIG. 12 when the processor has been interrupted by the customer loop byte clock BYSVC, it sets a RAM register bank for use by the INT0 module 500 in step 522 after saving the accumulator value and program status word in step 510. In step 524 the processor reads a data byte received from the customer loop and the framing bit associated with that data byte. In step 526 the processor checks a synchronism flag SYF which is preset to zero by the initialization routines. Accordingly, when the INT0 module 500 is called the first time, SYF is equal to zero and the processor branches to step 528 and obtains the abnormal station code for use as data. The data read by the microprocessor, for instance, the abnormal station code, is stored in the elastic buffer in step 530.

In step 532 the processor determines if it is time to check the byte framing pattern of previously received bytes. The framing pattern is tested upon the receipt of every sixth data byte as discussed above. Accordingly, if six data bytes have not been received, the processor executes step 534 to output byte length presets to the counters in the control logic, also discussed previously. In step 536 the processor checks the location of the load or storage pointer of the elastic buffer and, if it is at the top position, it stores the location of the elastic buffer dump pointer for a later performed realignment check discussed above in step 438 of the background processing loop 408. The processor then returns to the BAKGND loop 408.

If, in step 532, it is time to check the framing pattern, the processor proceeds in step 542 to compare the last six framing bits to a predefined byte framing pattern. If the received framing pattern is correct, the value of flag SYF is checked in 548 to determine whether it is one or zero. If it is not zero then the processor jumps to step 552, declares an in-synch condition, and sets the out-of-synch counter to four. If, in step 548 the value of SYF is zero, then the processor sets the storage and dump pointers of the elastic buffer to the desired alignment in step 550 and proceeds to step 552. The flag SYF is set to one and the out-of-synch counter is set to four in step 552. Processing then continues in step 534.

If, in step 542 the processor had determined that the received framing pattern was not correct, it would decrement the out-of-synch counter in step 544 and determine whether the out-of-synch counter had counted down to zero. If the out-of-synch counter has not counted out, processing returns to step 534. However, if the out-of-synch counter has counted down to zero, then the processor sets the SYF flag to zero, declares an out-of-synch condition, reinitializes the out-of-synch counter to a value of two, and modifies the receiver byte length preset code in order to slip a bit in the received bit stream in an attempt to synchronize the incoming data bytes with the desired framing pattern.

As a result of the above-described processing in the INT0 module 500, if the received data bytes are in synchronism, then the framing pattern must be bad four times before the processor will slip bits in the received bit stream. However, once an out-of-synchronism condition is determined by the processor, the framing pattern must be bad twice in a row before the processor will enable another bit slipping operation.

The interrupt processing module 600 processes data bytes from the modem toward the customer loop. Each data byte generated by the analog receiver 52 is read from the bidirectional converter 54 and reformatted with a framing bit for transfer to the control logic 60 where it is combined with a ninth or control bit. Also during INT1 processing a data byte in the elastic buffer is retrieved and output to the analog receiver 66 through the bidirectional converter 54.

Figure 13:
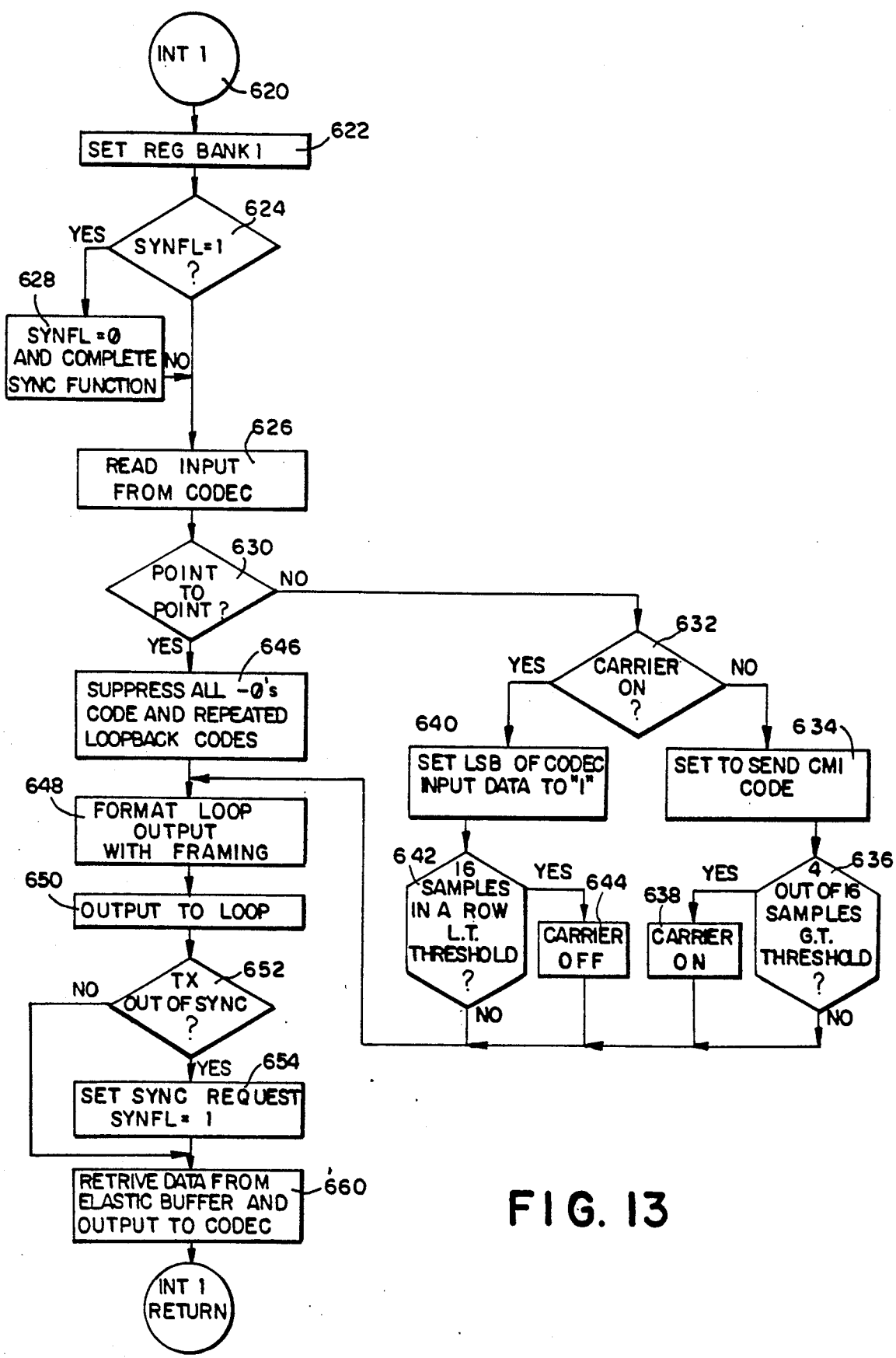
FIG. 13 is a logic flow diagram of the interrupt processing module INT1 shown in FIG. 10.

A logic diagram of the preferred INT1 processing module is shown in FIG. 13. Upon entry to the INT1 processing loop the processor sets the appropriate RAM register bank in step 622. In step 624 the processor checks the status of the synchronism flag SYNFL. If SYNFL is equal to 1 the processor changes SYNFL to zero in step 628 and completes the synchronizing function by outputting the signal HOLD to the control logic. If, however, the value of SYNFL is not one in step 624 then the processor proceeds to step 626 and reads the next data byte from the bidirectional converter.

In step 630 the processor then inquires whether the analog data station terminal is set for point-to-point operation or for MJU operation. If point-to-point operation had been selected, then the processor suppresses any all-zeroes code received by changing the least significant bit in such code to a binary one in step 646. If other than point-to-point operation is indicated in step 630 the processor checks whether the carrier is on by sampling data from the analog receiver 52 to determine if a data signal is present. If a data signal is present, the processor proceeds to step 640 and sets the least significant bit of the sampled data byte to a binary one. In step 642 the processor checks whether sixteen consecutive data samples are less than the preset threshold level of the peak detector. If they are, then the processor sets the carrier condition to "OFF" in step 644 and returns processing to the main loop of the INT1 module. If, however, in step 632 no carrier signal is present, the processor branches to step 634 and sends a command mode idle code to the central office through logic circuit 60 and bipolar transmitter 62. The processor then proceeds to step 636 and checks whether at least four out of sixteen data samples are greater than the preset threshold. If not, then processing returns to the main loop of the INT1 module. If, however, at least four out of sixteen samples are greater than the preset threshold, the processor sets the carrier condition to "ON" in step 638 and then returns processing to the main part of the loop.

In step 648 the processor adds a framing bit to each of the data bytes from the analog receiver. The framing bits are added in the predefined sequence, namely the framing pattern described above. In step 650 a control bit is added as the ninth bit, to the frame-formatted data byte, and the nine-bit byte is output to the control logic 60 for conversion to a nine bit serial stream.

The processor then checks for a transmission out of synchronism condition in step 652. If the transmission out-of-synch condition exists, then the processor sets the synchronism request flag SYNFL to a binary one. If no out-of-synch condition is detected, then the processor proceeds to step 660 and retrieves the next data byte identified by the dump pointer from the elastic buffer and writes it to the bidirectional converter 54 for transfer to the analog generator 66. At the end of the INT1 processing loop, processing is returned to the background loop 408.

In accordance with the present invention, a synchronous telecommunication system is provided having at least first and second customer data stations equipped for generating or receiving a modulated analog signal and at least one central office equipped for receiving a digital data signal from the first customer data station and for synchronously routing the digital data signal to the second customer data station. At least one of the customer data stations is equipped with an ADST used to send digital data to and receive digital data from the telephone company central office. The ADST is properly synchronized in operation so as to appear as an extension of the multiplexing equipment at the central office.

Synchronization between the ADST and the telephone company central office is achieved by use of a framing pattern in the digital transmission bit stream. For example, the standard 56 kilohertz (khz) data rate is increased to a 72 khz data rate by adding a framing bit and an eighth data bit to the standard 7 bit data word. The framing bit, as is well known, is positioned in the same location in each data word so that it can be readily detected. The 72 khz signal, for example, is portioned into 9 bit data words or bytes which consist of 8 bits of data and a byte framing bit for byte synchronization. Thus, each data byte can be transported to or from the customer in synchronism with the telephone network 8 kilohertz byte rate. Moreover, by defining a set pattern for the framing bits in each data word the analog data station terminal or the office channel unit at the central office can detect and maintain proper byte alignment so that information is not lost.

In operation, the ADST receives a serial data stream from the telephone company central office at the local customer loop rate, for example 72 khz. The bit rate clock of the received data stream is recovered by the ADST and is used to clock data back to the central office from the customer location. The 8 khz network byte clock and the 64 khz network bit clock are derived from the recovered customer loop bit clock and provided to the digital to analog coder to synchronize the coding process. For data to be transmitted from the customer to the central office, the analog receiver receives the analog signal from the customer modem and produces an N-bit parallel data word at a rate in synchronism with the 8 khz network byte clock. Each N bits of data are combined with a byte synchronizing or framing bit to provide a data stream back to the central office at the customer loop bit rate.

The net result of the process performed by the ADST is to provide analog service to the customer without the degradation normally found in analog service. Analog equalization is not required. The service provides essentially perfectly equalized analog data at the customer site.

Moreover, if the second customer data station is not equipped with an ADST and can receive only analog signals, then, in accordance with another feature of this invention, a fixed attenuator is provided in the ADST at the first customer data station. The fixed attenuator is configured to attenuate the amplitude of the analog signal from the first customer modem such that for a given signal amplitude, the analog signal received at the second customer data station has at least a predetermined amplitude. Such arrangement obviates the need for re-set up at the second customer premises and substantially eliminates high end group delay at the modem input.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. An analog data station terminal comprising:
   analog receiver means for receiving a network clock pulse and an analog signal and for converting said analog signal to a first parallel data word containing N bits of digital data at a first rate in synchronism with the network clock pulse;
   a computer responsive to the network clock pulse and operatively coupled to the analog receiver means, said computer being programmed for reading the first parallel data word and for converting said first parallel data word to a second parallel data word containing M bits of digital data in synchronism with the network clock pulse, such that M is greater than N; and
   digital transmitter means operatively coupled to said computer for receiving the second parallel data word in synchronism with the network clock pulse and for generating M serial bits of bipolar digital data at a second rate.

2. An analog data station terminal as recited in claim 1 wherein said computer is programmed to convert the first parallel data word to the second parallel data word by adding a data word framing bit to the N bits of digital data.

3. An analog data station terminal as recited in claim 1 wherein said analog receiver means comprises:
   an analog-to-digital converter for receiving the analog signal and generating a set of N serial bits of digital data representing said analog signal; and
   a serial-to-parallel converter responsive to the network clock pulse for converting the N serial bits of digital data to the first parallel data word.

4. An analog data station terminal comprising:
   digital receiver means for receiving M serial bits of bipolar digital information at a first rate and for converting the M serial bits into a first parallel data word containing the M bits;
   loop clock recovery means for generating a customer loop clock pulse in synchronism with the M serial bits received by the digital receiver means;
   a computer operatively connected to said digital receiver means and responsive to said customer loop clock pulse, said computer being programmed for reading the first parallel data word and converting said first parallel data word to a second parallel data word containing N bits of digital data in synchronism with said customer loop clock pulse, such that N is less than M; and
   analog generating means responsive to a network clock pulse and operatively connected to said computer for receiving the second parallel data word in synchronism with the network clock pulse and for generating an analog signal from the second parallel data word.

5. An analog data station terminal as recited in claim 4 wherein said analog generating means comprises:
   a parallel-to-serial converter responsive to the network clock pulse for receiving the second parallel data word and for generating a set of N serial bits of digital data in synchronism with the network clock pulse; and
   a digital-to-analog converter for receiving the N serial bits from said parallel-to-serial converter and generating the analog signal therefrom.

6. An analog data station terminal as recited in claim 4 wherein the first parallel data word has a data word framing bit, said digital receiver means includes means for generating a framing bit parallel word which contains the framing bits of a plurality of sequential, first parallel data words and said computer is programmed to determine the sequence of the data word framing bits in the framing bit parallel word and to compare said framing bit sequence to a reference framing bit sequence.

7. An analog data station terminal as recited in claim 6 wherein said computer is programmed to effect realignment of the M bits in the first parallel data word when the determined framing bit sequence does not match the reference framing bit sequence.

8. An analog data station terminal as recited in claim 6 wherein said framing bit parallel word generating means includes:
   a first serial-to-parallel converter for receiving the M serial bits of digital information; and
   a second serial-to-parallel converter operatively connected to said first serial-to-parallel converter for receiving the data word framing bit in each set of M serial bits received by said first serial-to-parallel converter and for generating the framing bit parallel word.

9. An analog data station terminal as recited in claim 8 wherein said computer is programmed to read the framing bit parallel word and to compare the bit sequence of the framing bit parallel word to the reference framing bit sequence whereby the beginning and end of each first parallel data word can be determined.

10. An analog data station terminal as recited in claim 9 wherein said computer is programmed to effect realignment of the M bits in the first parallel data word when the bit sequence of the received framing bit parallel word does not match the reference framing bit sequence.

11. An analog data station terminal as recited in claim 4 wherein said computer comprises an accessible memory and said computer is programmed to store the second parallel data word in said accessible memory in synchronism with the customer loop clock pulse and to transfer the second parallel data word to said analog generating means in synchronism with the network clock pulse.

12. An analog data station terminal comprising:
analog receiver means for receiving a network clock pulse and a first analog signal and for converting said analog signal to a first parallel data word containing N bits of digital data at a first rate in synchronism with the network clock pulse;
digital receiver means for receiving M serial bits of bipolar digital information at a second rate and for converting the M serial bits into a second parallel data word containing M data bits where M is an integer greater than N;
loop clock recovery means for generating a customer loop clock pulse in synchronism with the M serial bits received by the digital receiver means,
a computer responsive to the network clock pulse and the customer loop clock pulse and operatively coupled to the analog and digital receiver means said computer being programmed for reading the first parallel data word and converting said first parallel data word to a third parallel data word containing M bits of digital data in synchronism with the network clock pulse, and for reading said second parallel data word and converting said second parallel data word to a fourth parallel data word containing N bits of digital data in synchronism with said customer loop clock pulse;
analog generating means operatively coupled to said computer for receiving the fourth parallel data word in synchronism with the network clock pulse; and generating a second analog signal from said fourth parallel data word; and
digital transmitter means operatively coupled to said computer for receiving the third parallel data word and generating M serial bits of bipolar digital information at said second rate from the third parallel data word in synchronism with the network clock pulse.

13. An analog data station terminal as recited in claim 12 wherein said analog receiver means comprises:
an analog-to-digital converter for receiving the first analog signal and generating a first set of N serial bits of digital data representing said first analog signal; and
a serial-to-parallel converter responsive to the network clock pulse for converting the first set of N serial bits of digital data to the first parallel data word.

14. An analog data station terminal as recited in claim 13 wherein said analog generator means comprises:
a parallel-to-serial converter responsive to the network clock pulse for receiving the fourth parallel data word and generating a second set of N serial bits of digital data in synchronism with the network clock pulse; and
a digital-to-analog converter for receiving the second set of N serial bits from said parallel-to-serial converter and generating the second analog signal therefrom.

15. An analog data station terminal as recited in claim 13 wherein said computer is programmed to convert the first parallel word to the third parallel word by adding a data word framing bit to the first parallel word.

16. An analog data station terminal as recited in claim 15 wherein the second parallel data word has a data word framing bit, said digital receiver means includes means for generating a framing bit parallel word which contains the framing bits of a plurality of sequential, second parallel data words, and said computer is programmed to determine the sequence of the data word framing bits in the framing bit parallel word and to compare said framing bit sequence to a reference framing bit sequence.

17. An analog data station terminal as recited in claim 16 wherein said computer is programmed to effect re-alignment of the M bits in the second parallel data word when the determined framing bit sequence does not match the reference framing bit sequence.

18. An analog data station terminal as recited in claim 16 wherein said framing bit parallel word generating means includes:
a first serial-to-parallel converter for receiving the M serial bits of digital information; and
a second serial-to-parallel converter operatively connected to said first serial-to-parallel converter for receiving the data word framing bit in a set of M serial bits received by said first serial to parallel converter and for generating the framing bit parallel word.

19. An analog data station terminal as recited in claim 18 wherein said computer is programmed to read the framing bit parallel word and to compare the bit sequence of the framing bit parallel word to a reference framing bit sequence whereby the beginning and end of each second parallel data word can be determined.

20. An analog data station terminal as recited in claim 19 wherein said computer is programmed to effect re-alignment of the M bits in the second parallel data word when the bit sequence of the received framing bit parallel word does not match the reference bit sequence.

21. An analog data station terminal as recited in claim 12 wherein said computer comprises an accessible memory and said computer is programmed to store the fourth parallel data word in said accessible memory in synchronism with the customer loop clock pulse and to transfer the fourth parallel data word to said analog generating means in synchronism with the network clock pulse.

22. An analog data station terminal as recited in claim 12 wherein M is at least N+1.

23. In a synchronous data telecommunications system of the type having first and second customer data stations for generating or receiving a data signal and a central office for routing data signals between said first and second customer data stations in synchronism with a network clock, a system for transporting the data signals in digital form comprising:
an analog data station terminal at the first customer data station, said analog data station terminal including:
analog receiver means for receiving the network clock and an analog signal and for converting said analog signal to a first parallel data word containing N bits of digital data at a first rate in synchronism with the network clock;
a computer responsive to the network clock and operatively coupled to the analog receiver means, said computer being programmed for reading the first parallel data word and for converting said first parallel data word to a second parallel data word containing M bits of digital data in synchronism with the network clock, such that M is greater than N; and digital transmitter means operatively coupled to said computer for receiving the second parallel data word in synchronism with the network clock and for generating M serial bits of bipolar digital data at a second rate, whereby a digital data word is transmitted to the central office.

24. A system as set forth in claim 23 wherein the analog data station terminal further comprises a fixed attenuator for attenuating the amplitude of the analog signal to a predetermined level.

25. A system as set forth in claim 23 wherein the central office includes:

means for receiving the digital data word;

means for converting the digital data word back to an analog signal; and means for transmitting said analog signal to the second customer data station.

26. A system as recited in claim 25 wherein the second customer data station includes a modem for receiving the analog signal from the central office and the analog data station terminal comprises a fixed attenuator for attenuating the amplitude of the analog signal such that for a given analog signal amplitude received by the analog data station terminal, the analog signal received by the modem at the second customer data station has at least a predetermined amplitude.

27. A system as set forth in claim 23 wherein the second customer data station includes a second analog data station terminal, said second analog data station terminal comprising:

digital receiver means for receiving the M serial bits of bipolar digital data from the central office at the second rate and for converting the M serial bits into a third parallel data word containing said M bits;

loop clock recovery means for generating a customer loop clock pulse in synchronism with the M serial bits received by the second analog data station terminal;

a computer operatively connected to said digital receiver means and responsive to the customer loop clock pulse, said computer being programmed for reading the third parallel data word and converting said third parallel data to a fourth parallel data word containing N bits of digital data in synchronism with the customer loop clock pulse, such that N is less than M; and analog generating means responsive to the network clock pulse and operatively connected to said computer for receiving the fourth parallel data word in synchronism with the network clock and for generating an analog signal from said fourth parallel data word.

28. A system as set forth in claim 23 wherein said analog receiver means comprises:

an analog-to-digital converter for converting the analog signal to a digital data word containing N serial bits of digital data;

a serial-to-parallel converter for converting the digital data word to the first parallel data word in synchronism with the network clock; and a computer responsive to the network clock, and programmed for reading the first parallel data word and for converting the first parallel data word to a second parallel data word containing N bits of digital data and a data word synchronizing bit, in synchronism with the network clock.

* * * * *

UNITED STATES PATENT AND TRADEMARK OFFICE
CERTIFICATE OF CORRECTION

PATENT NO. : 5,040,190

DATED : August 13, 1991

INVENTOR(S) : MARK C. SMITH and ROGER W. CAIN

It is certified that error appears in the above-identified patent and that said Letters Patent is hereby corrected as shown below:

Column 12:

line 19, "WB" should read --$\overline{WB}$--.

Column 14:

line 33, "RD1" should read --$\overline{RD1}$--;

line 42, "RD1" should read --$\overline{RD1}$--;

line 48, "RD1" should read --$\overline{RD1}$--;

line 52, "WR2" should read --$\overline{WR2}$--;

Column 17:

line 62, "WDOG" should read --$\overline{WDOG}$--;

line 65, "WDOG" should read --$\overline{WDOG}$--.

Signed and Sealed this

Fifteenth Day of June, 1993

*Attest:*

MICHAEL K. KIRK

*Attesting Officer*     Acting Commissioner of Patents and Trademarks